(12) United States Patent
Nagaraju et al.

(10) Patent No.: US 10,613,742 B2
(45) Date of Patent: *Apr. 7, 2020

(54) METHOD OF PROVIDING USER INTERACTION WITH A WEARABLE DEVICE AND WEARABLE DEVICE THEREOF

(71) Applicant: Samsung Electronics Co., Ltd., Suwon-si, Gyeonggi-do (KR)

(72) Inventors: Samudrala Nagaraju, Bangalore (IN); Surjeet Govinda Dash, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/368,014

(22) Filed: Mar. 28, 2019

(65) Prior Publication Data

US 2019/0220166 A1 Jul. 18, 2019

Related U.S. Application Data

(63) Continuation of application No. 14/691,901, filed on Apr. 21, 2015, now Pat. No. 10,275,143.

(30) Foreign Application Priority Data

Apr. 22, 2014 (IN) .......................... 2057/CHE/2014
Nov. 10, 2014 (IN) .......................... 2057/CHE/2014
Apr. 7, 2015 (KR) ........................ 10-2015-0048833

(51) Int. Cl.
*G06F 3/01* (2006.01)
*G06F 3/0488* (2013.01)
(Continued)

(52) U.S. Cl.
CPC ............ *G06F 3/0488* (2013.01); *G06F 1/163* (2013.01); *G06F 1/1643* (2013.01);
(Continued)

(58) Field of Classification Search
CPC ...... G06F 1/163; G06F 1/1643; G06F 1/1684; G06F 1/1694; G06F 2200/1637;
(Continued)

(56) References Cited

U.S. PATENT DOCUMENTS 6,432,060 B1 * 8/2002 Amano ................ A61B 5/021
600/485
2005/0276164 A1 12/2005 Amron
(Continued)

FOREIGN PATENT DOCUMENTS

JP       2006-267456 A    10/2006
KR       10-0608576 B1    7/2006
WO       2010/076944 A1   7/2010

*Primary Examiner* — Richard J Hong
(74) *Attorney, Agent, or Firm* — Jefferson IP Law, LLP

(57) ABSTRACT

A wearable device and a method of providing user interaction with the wearable device is provided. The method includes receiving one or more signals from at least one of one or more pressure sensors and one or more vibration sensors, obtaining information related to at least one of an orientation of the wearable device on a user hand and a hand on which the wearable device being worn based on the one or more signals received, and performing one or more functions based on the obtained information.

29 Claims, 30 Drawing Sheets

(51) Int. Cl.
*G06F 1/16* (2006.01)
*G06F 3/038* (2013.01)
*G06F 3/0346* (2013.01)

(52) U.S. Cl.
CPC .......... *G06F 1/1684* (2013.01); *G06F 1/1694* (2013.01); *G06F 3/016* (2013.01); *G06F 3/038* (2013.01); *G06F 3/0346* (2013.01); *G06F 2200/1637* (2013.01); *G06F 2203/0381* (2013.01)

(58) Field of Classification Search
CPC .............. G06F 2203/0381; G06F 3/016; G06F 3/0346; G06F 3/038; G06F 3/0488; G06F 3/014; A61B 5/11; A61B 5/021
See application file for complete search history.

(56) References Cited

U.S. PATENT DOCUMENTS

| | | |
|---|---|---|
| 2006/0111093 A1 | 5/2006 | Shim et al. |
| 2010/0235667 A1 | 9/2010 | Mucignat et al. |
| 2011/0014956 A1 | 1/2011 | Lee et al. |
| 2012/0127070 A1* | 5/2012 | Ryoo .................... G06F 3/014 345/156 |
| 2013/0143519 A1 | 6/2013 | Doezema |
| 2014/0045547 A1 | 2/2014 | Singamsetty et al. |
| 2014/0253487 A1 | 9/2014 | Bezinge et al. |
| 2015/0161885 A1 | 6/2015 | Wang et al. |
| 2015/0185944 A1 | 7/2015 | Magi et al. |
| 2015/0227245 A1 | 8/2015 | Inagaki et al. |
| 2015/0301606 A1 | 10/2015 | Andrei |
| 2016/0349803 A1 | 12/2016 | Dusan |
| 2017/0010678 A1* | 1/2017 | Tuli ....................... G06F 1/163 |
| 2017/0052512 A1 | 2/2017 | Mizunuma et al. |
| 2019/0129508 A1* | 5/2019 | Harrison ................ A61B 5/11 |

* cited by examiner

FIG. 2
(RELATED ART)
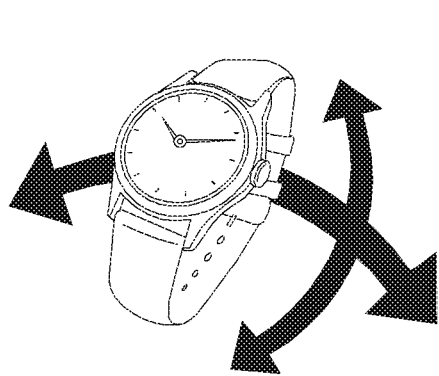
TILT 201
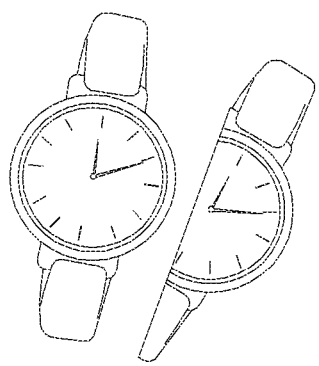
SHAKE 202

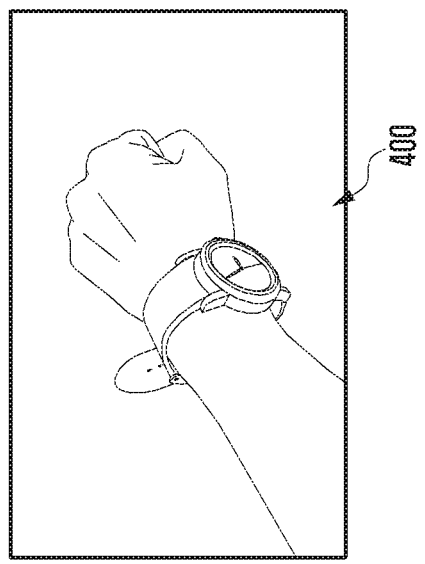
FIG. 4A UPWARD
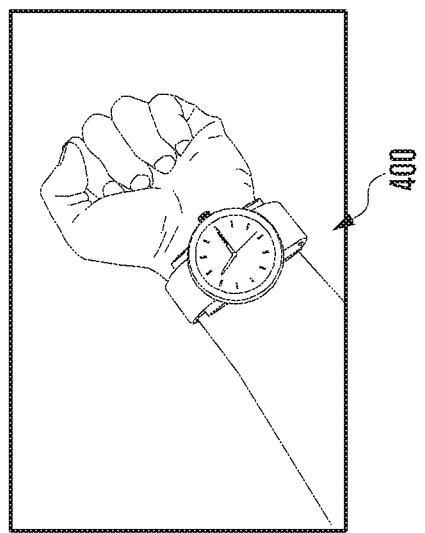
FIG. 4B DOWNWARD
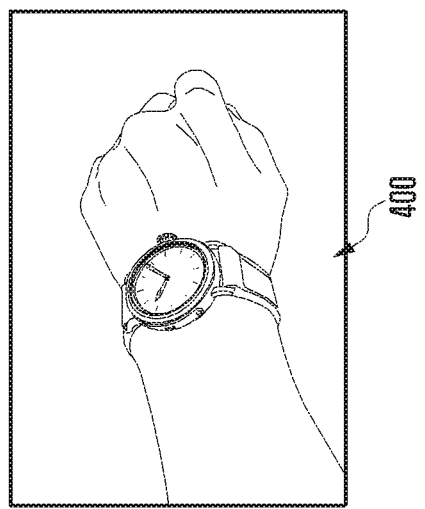
FIG. 4C SIDE

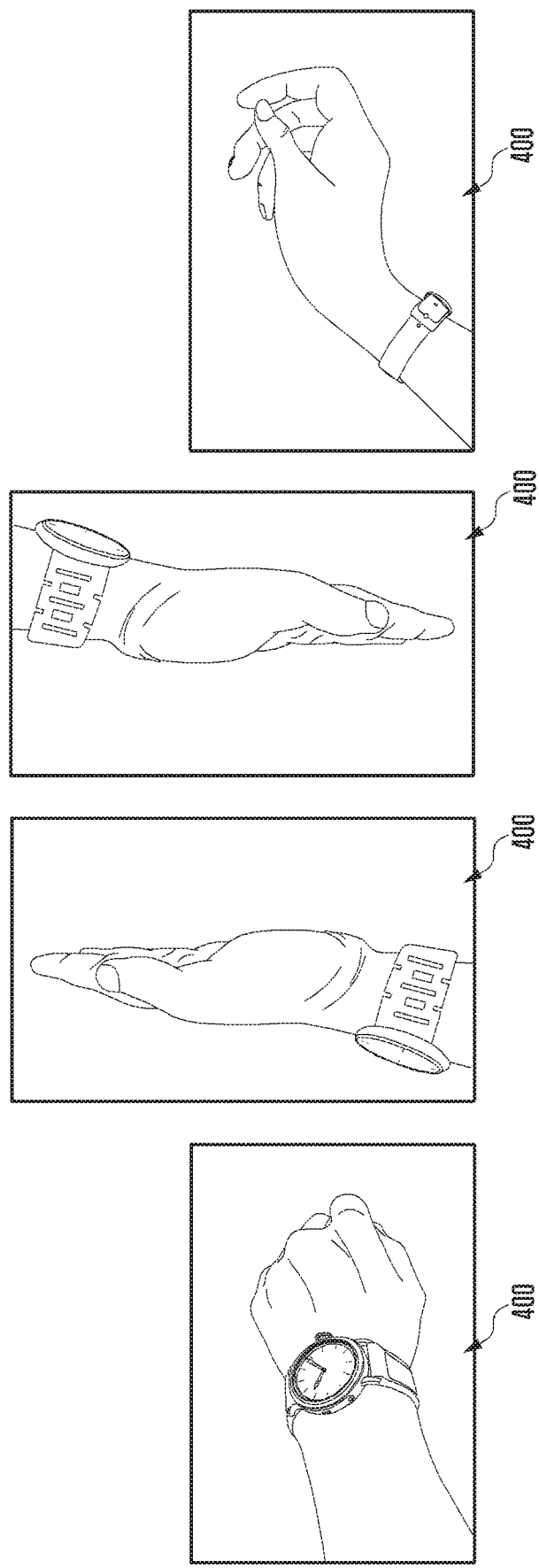

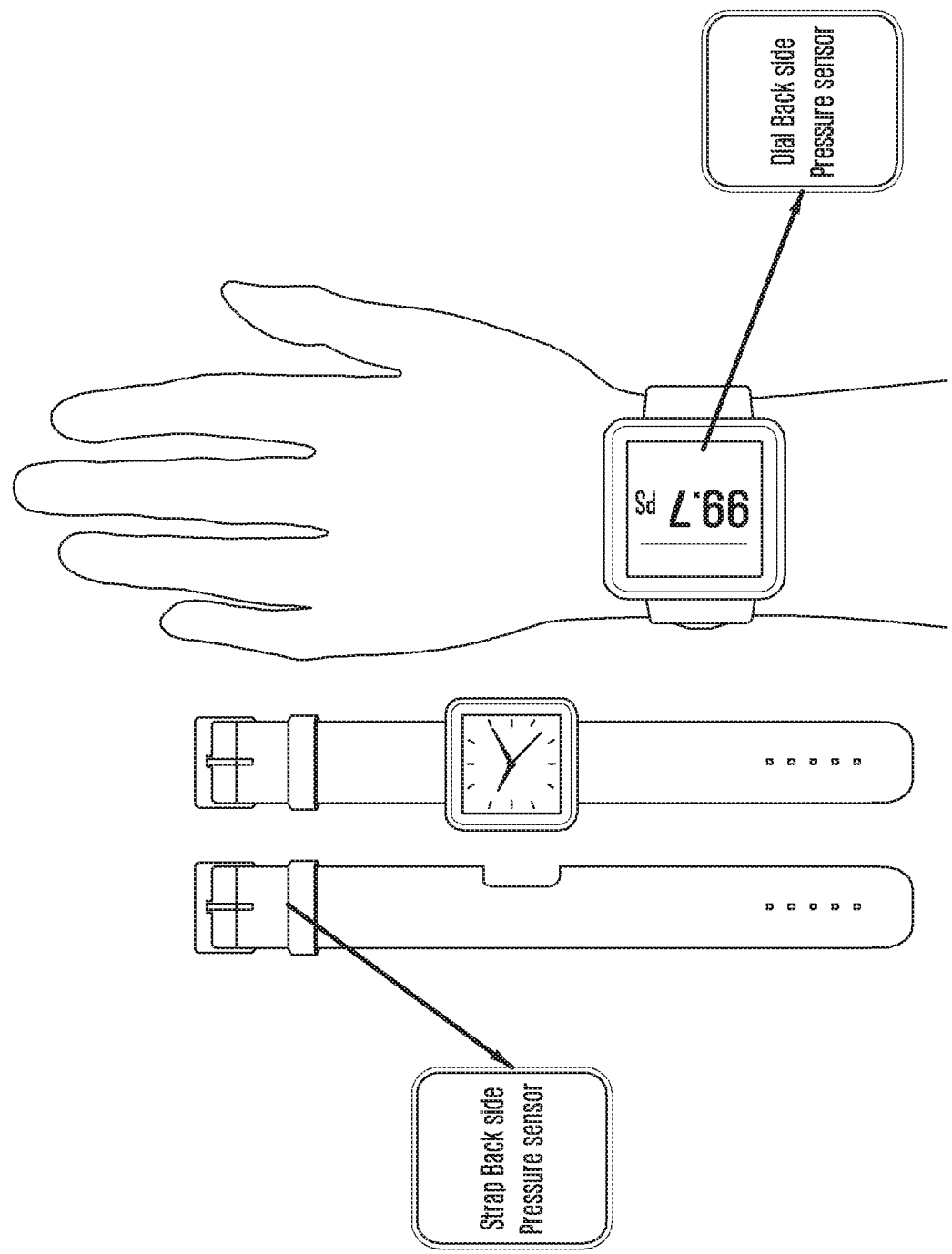

FIG. 6C

Active Technology
Nano-tubes Composite

Surface Pressure Range
* 0 – 150 PSI [0 – 105kg/cm]

Matrix Size
Up to 32 × 32 lines

Sensing Points
Up to 1,024 total

Sensing Area Size
Up to 14 × 14 in. [35.6 × 35.6 cm]

Scan Speed
Up to 800 FPS

Temperature Capability
Up to 200°F [93°C]

Spatial Resolution
From 0.06 in. [1.6mm]

Thickness
16 mils [0.4mm]

Accuracy
± 10%

Repeatability
± 2%

Hysteresis
± 5%

Non-linearity
± 1.5%

FIG. 9B

| Wearable Hand | Wearable Mode | Hand Turn Position (degree) | Visibility Status | Angle of Visibility |
|---|---|---|---|---|
| Left | Upward | Normal | YES | |
| | | Normal + 90 | NO | |
| | | Normal − 90 | NO | |
| | | Normal + 180 | NO | |
| | Downward | Normal | NO | |
| | | Normal + 90 | YES | |
| | | Normal − 90 | YES | |
| | | Normal + 180 | YES | |
| | Side | Normal | NO | |
| | | Normal + 90 | YES | TO CALCULATE BASED ON THE PARAMETERS |
| | | Normal − 90 | NO | |
| | | Normal + 180 | NO | |
| Right | Upward | Normal | YES | |
| | | Normal + 90 | NO | |
| | | Normal − 90 | NO | |
| | | Normal + 180 | NO | |
| | Downward | Normal | NO | |
| | | Normal + 90 | YES | |
| | | Normal − 90 | YES | |
| | | Normal + 180 | YES | |
| | Side | Normal | NO | |
| | | Normal + 90 | YES | |
| | | Normal − 90 | NO | |
| | | Normal + 180 | NO | |

FIG. 14B
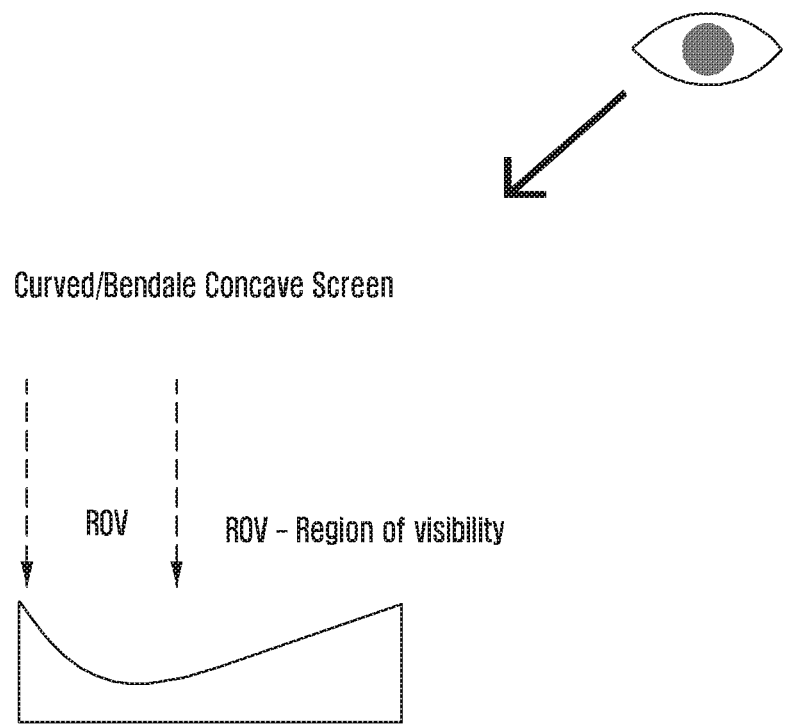
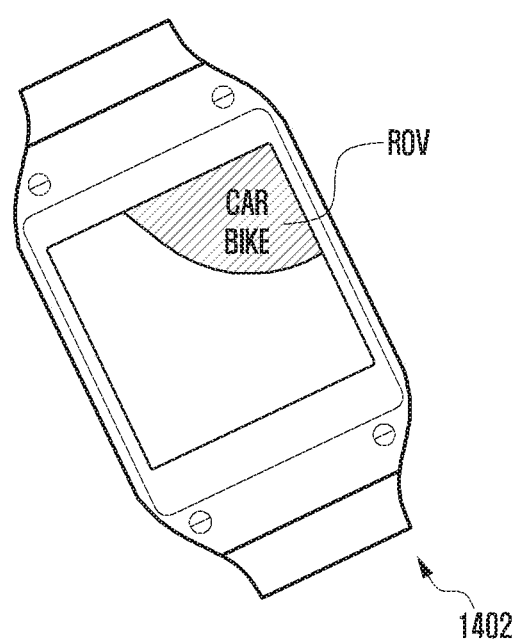

FIG. 18
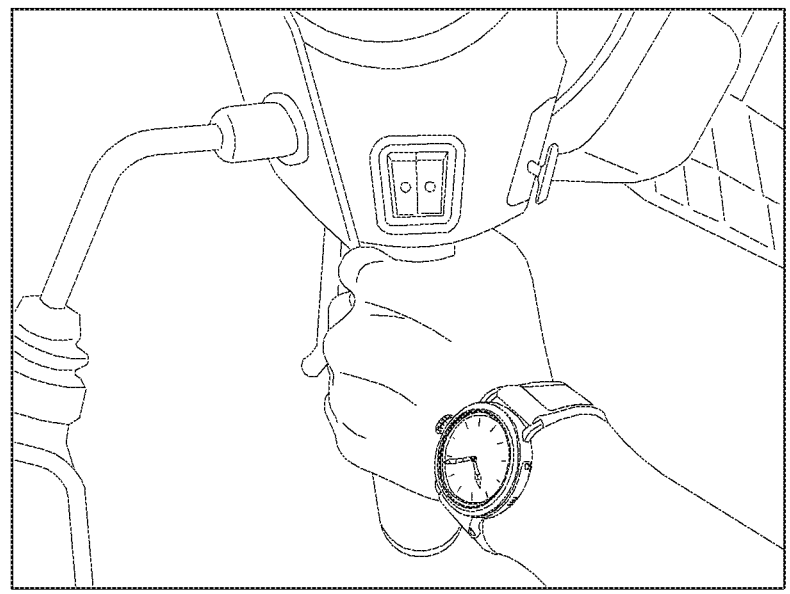
[1820]
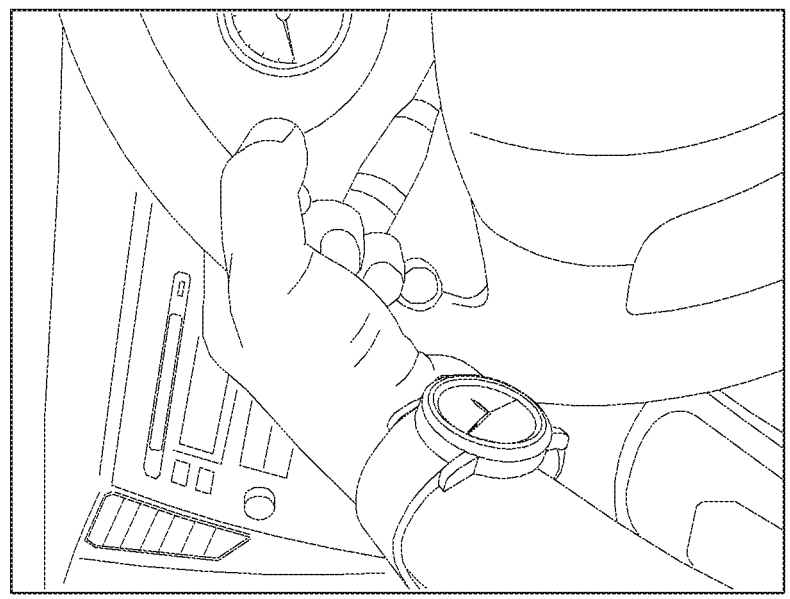
[1810]

FIG. 21
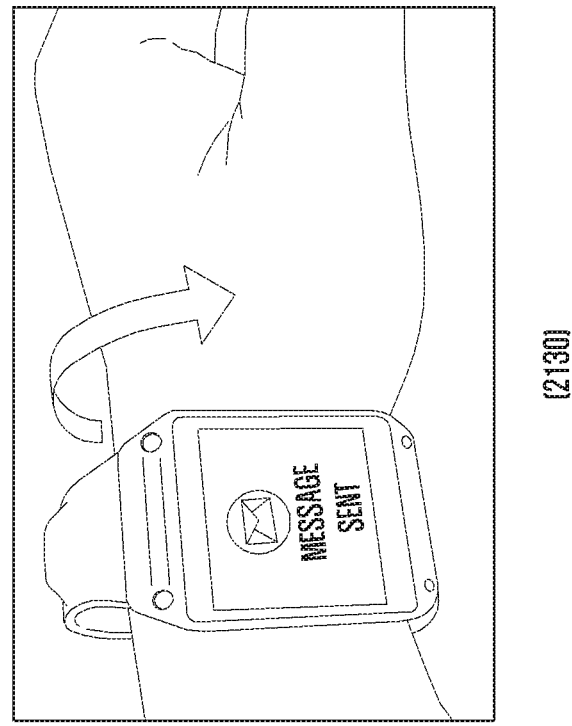
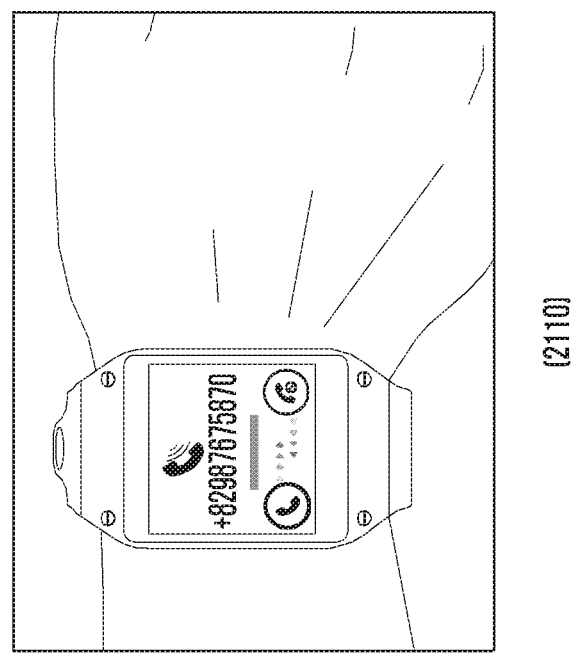

METHOD OF PROVIDING USER INTERACTION WITH A WEARABLE DEVICE AND WEARABLE DEVICE THEREOF

CROSS-REFERENCE TO RELATED APPLICATION(S)

This application is a continuation application of prior application Ser. No. 14/691,901, filed on Apr. 21, 2015, which was based on and claimed priority under 35 U.S.C. § 119(e) of an Indian Provisional application filed on Apr. 22, 2014 in the Indian Patent Office and assigned Serial number 2057/CHE/2014, and under 35 U.S.C. § 119(a) of an Indian Complete application filed on Nov. 10, 2014 in the Indian Patent Office and assigned Serial number 2057/CHE/2014, and of a Korean patent application filed on Apr. 7, 2015 in the Korean Intellectual Property Office and assigned Serial number 10-2015-0048833, the entire disclosure of each of which is hereby incorporated by reference.

TECHNICAL FIELD

The present disclosure relates to electronic devices. More particularly, the present disclosure relates to wearable device such as smart device and a method of providing user interaction with the wearable device.

BACKGROUND

Integration of mobile phone features in to wearable devices, especially watches is a common concept in a communication scenario. Such integration typically provides main functions of communication, like voice call, sending messages, voice chat and the like, supported by a wireless head set and other peripheral devices. Smart watches according to the related art are operated through a key pad or a touch screen.

According to the advancement of technology, the mobile phones sensitive towards the free movement are available in market. Mobile phones have been known to implement gesture functions based on movement of a mobile phone by using inputs from various sensors such as accelerometer, gyro meter, magnetometer and the like. However, technologies according to the related art are limited in detecting such movements in specific directions. Therefore, there is a need to overcome this limitation and implement a wide variety of gestures and movements to realize various actions with a wearable device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wearable device and a method of providing user interaction with the wearable device.

Another aspect of the present disclosure is to define a set of gestures for a wearable device.

Another aspect of the present disclosure is to precisely identify information related to direction of wearable device, location of wearable device, and alignment of wearable device through various sensors such as gyroscope, pressure sensor, and vibration sensor.

In accordance with an aspect of the present disclosure, a method of providing user interaction with a wearable device which includes a display is provided. The method includes receiving at least one signal from at least one of at least one pressure sensor and at least one vibrating sensorss, obtaining information related to at least one of an orientation of the display on a user hand and a hand on which the wearable device is being worn based on the one or more signals received, and performing at least one function based on the obtained information.

An embodiment of the present disclosure describes a wearable device. For the purposes of this disclosure, the wearable device includes at least one of at least one or more pressure sensors and at least one or more vibration sensors, a processor configured to receive at least one signal from at least one of the at least one pressure sensor and the at least one vibration sensor, to obtain information related to at least one of an orientation of the wearable device on a user hand and a hand on which the wearable device is being worn based on the at least one signal, and to perform at least one function based on the obtained information.

According to various embodiments of the present disclosure, the wearable device may more accurately identify information such as a direction, a position, and a layout of the wearable device based on various sensors including a pressure sensor, a vibration sensor, or gyroscope sensor.

Further, as the wearable device according to various embodiments of the present disclosure detects various gesture inputs, a user may receive an effective interaction function with the wearable device.

According to various embodiments of the present disclosure, the wearable device may more accurately identify information such as a direction, a position, and a layout of the wearable device based on various sensors including a pressure sensor, a vibration sensor, or a gyroscope sensor.

Further, as the wearable device according to various embodiments of the present disclosure detects various gesture inputs, a user may receive an effective interaction function with a smart device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 illustrates a plurality of gestures for a smart phone exists in the art according to an embodiment of the present disclosure;

FIGS. 4A, 4B, and 4C illustrate various wearable positions of watch according to various embodiments of the present disclosure;

FIGS. 5A, 5B, 5C, and 5D illustrate various turn positions of a watch with respect to normal upward wearable portion according to various embodiments of the present disclosure;

FIG. 6B illustrates an example of a smart watch including pressure sensors according to an embodiment of the present disclosure;

FIG. 6C illustrates an example of spec information of pressure sensors according to an embodiment of the present disclosure;

FIG. 9B illustrates the visibility status according to a wearable modes, a positioning of the user hand, and a hand on which the wearable device is being worn according to an embodiment of the present disclosure;

FIGS. 14A and 14B illustrate various types of screens of the smart watch according to various embodiments of the present disclosure;

FIG. 18 illustrates an example of a composition in which a wearable device is visibility status in a car or a bike according to an embodiment of the present disclosure;

FIG. 21 illustrates an example of an operation in which a wearable device performs a particular function according to a user interaction according to an embodiment of the present disclosure;

Throughout the drawings, it should be noted that like reference numbers are used to depict the same or similar elements, features, and structures.

DETAILED DESCRIPTION

Figure 1:
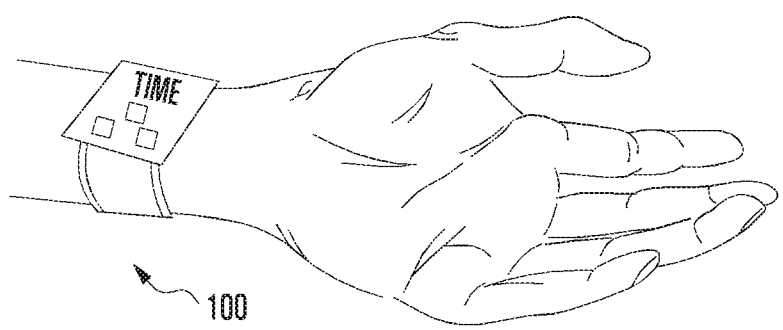
FIG. 1 illustrates a schematic representation of a smart device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

It will be further understood that the terms "includes", "comprises", "including" and/or "comprising" when used in this specification, specify the presence of stated features, integers, operations, elements and/or components, but do not preclude the presence or addition of one or more other features integers, operations, elements, components, and/or groups thereof. It will be understood that when an element is referred to as being "connected" or "coupled" or "attached" or "configured" to another element, it may be directly connected or coupled to the other element or intervening elements may be present. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure describes a wearable device and a method of providing user interaction with a wearable device. The smart device is configured for determining an orientation of the smart device on a user hand (wearable mode), determining a positioning of the user hand, and determining a hand on which the smart device being worn.

FIG. 1 illustrates a schematic representation of a wearable device 100 according to an embodiment of the present disclosure.

Referring to FIG. 1, a wearable device 100 is a smart watch 100 which may have some of the capabilities of a smart phone. The wearable device 100 is a wearable communication device. The smart watch 100 generally includes all the features of smart phones including third party applications. Smart phones according to the related art are capable of detecting various gestures pre-defined by the user. Some non-limiting examples of such gestures involving movement of the smart device may include tilt, shake, flip up, flip down, and rotate, and the like.

FIG. 2 illustrates a plurality of gestures for a smart phone exists in the art according to an embodiment of the present disclosure.

Referring to FIG. 2, some of such gestures related to motion such as tilt of a wearable device 201 and shake of a wearable device 202 are shown. The smart mobile phones are configured to perform the pre-set activities along with identifying the aforesaid gestures. However, in case of a hand, the action of a tilt or a shake of the smart device cannot impart a specific gesture.

Figure 3:
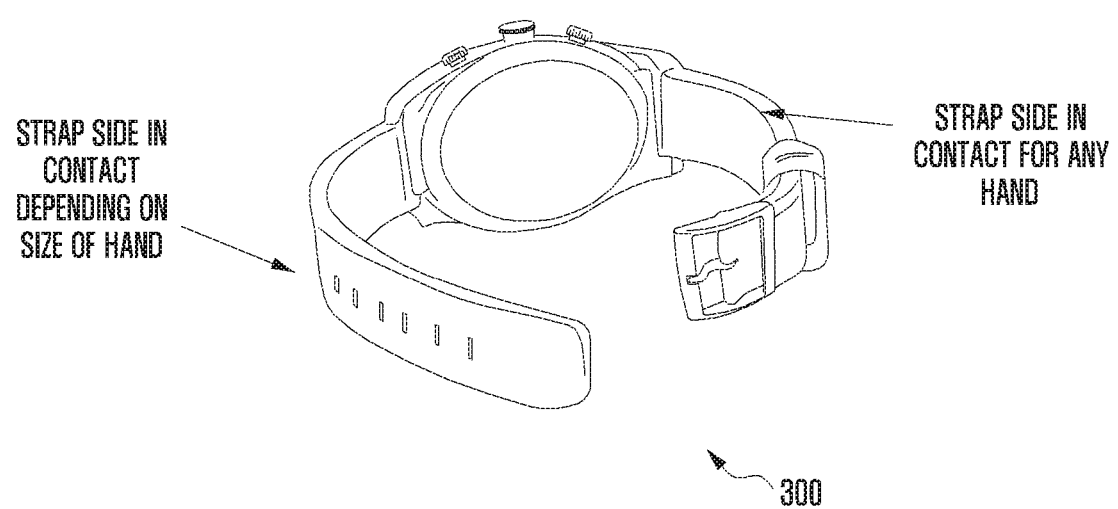
FIG. 3 illustrates a schematic diagram of a watch according to the related art.

FIG. 3 illustrates a schematic diagram of a smart watch 300 according to the related art. The dial and two portions of the strap are in contact with a human hand in a wearable mode and thus are essential element of the watch 300. These elements configured appropriately with sensors enable the smart watch 300 to identify the gestures.

FIGS. 4A, 4B, and 4C illustrate different wearable positions of smart watch 400 according to various embodiments of the present disclosure.

FIGS. 4A to 4C depict three wearable modes of a smart watch 400 such as upward, downward and side. The wearable mode indicates a location of a user's wrist on which a display of the wearable device is worn. The wearable modes are not limited to the three modes and various modes may be configured. The upward mode of the smart watch 400 means that the watch 400 is positioned on the upper side of the wrist. For example, the upward mode means that the display of the smart watch 400 is exposed in a direction of the back of the hand of the wrist as illustrated in FIG. 4A. The downward mode of the smart watch 400 means that the smart watch 400 is positioned on the back side of the wrist. For example, the downward mode means that the display of the smart watch 400 is exposed in a direction of the palm. The side mode of the smart watch 400 means that the watch 400 is positioned to face a direction of side of the wrist such as FIG. 4C other than the upward and the downward modes. In order to detect the wearable modes, one or more types of sensors are configured in the smart watch 400. The sensory maybe, pressure sensors and vibration sensors, and the like. The sensors are placed at different parts of the smart watch 400 according to pre-defined configuration in order to detect the positioning and movements of the smart watch 400. In an embodiment of the present disclosure, the sensors are configured on a strap as well as a dial of the smart watch 400. The elements such as Miniature piezo resistive, piezo electric, capacitive and elasto resistive sensor, new nano material, and the like, may be used for receiving the pressure sensor signals.

In an embodiment of the present disclosure, one or more pressure sensors are configured at the back of the dial of the smart watch 400 and one or more portions of the strap in order to provide sensors signals when get in contact with the human body. Considering a case where the smart watch 400 is in upward position as shown in FIG. 4A, the pressure sensors attached at the back of the dial imparts more pressure than the pressure sensors on the strap. Whereas if the smart watch 400 is in downward position as shown in FIG. 4B, the pressure sensors attached to the end portion of the strap imparts more pressure than the pressure sensors at the back of the dial. Accordingly, when the smart watch 400 is positioned at the side as shown in FIG. 4C, the pressure sensors at the back of the dial and at the strap provide almost equal pressure. In this embodiment of the present disclosure, the sensors are configured at two or more places such as the dial and the strap to determine one or more pressure signals from the pressure sensors for identifying the positioning or wearable mode of the smart watch 400.

The pressure sensors configured at various places of the smart watch 400 enable the smart watch 400 to detect the positioning or wearable mode of the smart watch 400. This is an embodiment of the present disclosure where various alterations are possible to identify the wearable mode of the smart watch 400.

In an embodiment of the present disclosure, one or more vibrating sensors are configured at a back of the dial of the smart watch 400 and one or more portions of the strap in order to provide sensor signals when in contact with the human body.

FIGS. 5A, 5B, 5C, and 5D illustrate various turn positions of a smart watch according to various embodiments of the present disclosure.

Referring to FIGS. 5A-5D, the turn positions of a smart watch 400 are depicted with respect to normal upward wearable position. The normal upward wearable position means the display of the smart watch 400 is positioned on the upper side of wrist with a palm facing downwards in a resting position. FIG. 5B shows "normal+90°" turn position of the smart watch 400 when the smart watch 400 is tilted by 90° in an anti-clockwise direction. FIG. 5C shows "normal−90°" turn position of the smart watch 400 when the smart watch 400 is tilted by 90° in a clockwise direction. FIG. 5D shows "normal+180°" turn position of the smart watch when the smart watch is tilted by 180° in a clockwise direction. The direction of turn position is determined based on one or more signals received from one or more gyroscopes configured in the smart watch 400.

Figure 6A:
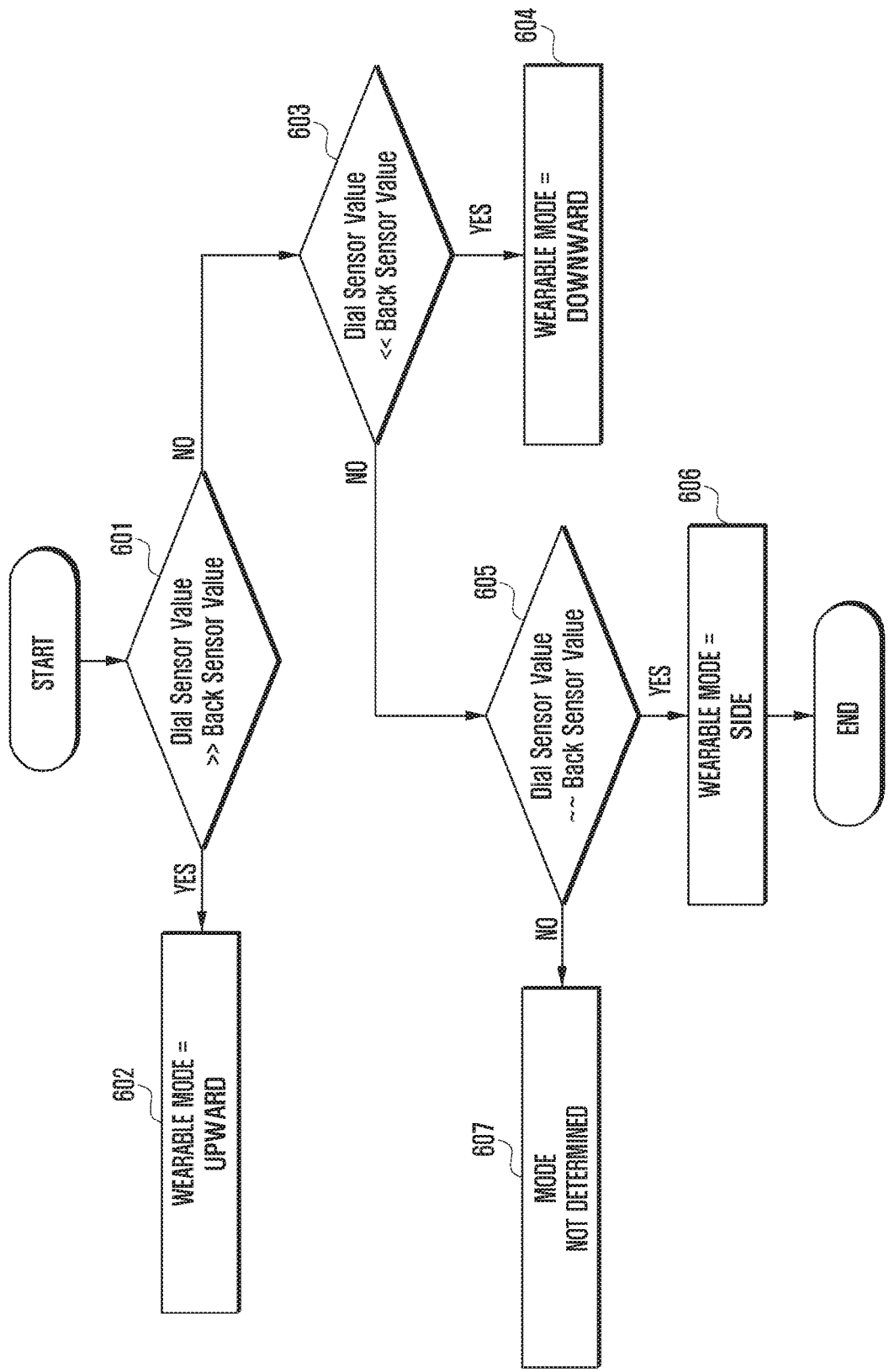
FIG. 6A is a flow chart of a method of determining different wearable modes of a smart watch according an embodiment of the present disclosure.

FIG. 6A is a flow chart of a method of determining different wearable modes of a smart watch according to an embodiment of the present disclosure.

FIG. 6B illustrates an example of a smart watch including pressure sensors according to an embodiment of the present disclosure.

Referring to FIGS. 6A-5B, in order to detect the wearable mode, signals received from the sensors configured at the back of the dial and at the straps are compared. For example, the processor of smart watch 400 may obtain sensor value of pressure sensors which are located at a body and a strap of the smart watch 400. Then, the processor of smart watch 400 may compare the obtained sensor value. These pressure sensors may be located on smart watch 400 such as the FIG. 6B.

The wearable mode determines the positioning of dial or visibility of smart watch 400 to the user. At operation 601, dial sensor values received from a first set of pressure sensors configured at the back of dial (body) are compared with back sensor values received from a second set of pressure sensors configured at the strap (e.g., a back of the strap). The pressure sensor attached to the strap of the smart watch 400 is represented as a back sensor. If the dial sensor value is greater than the back sensor value, then at operation 602, the wearable mode is determined as upward mode. According to an embodiment of the present disclosure, if the dial sensor value is greater than the back sensor value and a difference between the dial sensor value and the back sensor value is greater than or equal to a certain threshold, the processor may determine the wearable mode as the upward mode. The upward mode means that the smart watch 400 is positioned on the upper side of the wrist. For example, the upward mode means that the display of the smart watch 400 is positioned to face a direction of the back of the hand on the wrist. If the dial sensor value is less than the back sensor value in operation 603, the wearable mode is determined as downward mode as shown in operation 604. According to an embodiment of the present disclosure, when the dial sensor value is less than the back sensor value and a difference between the dial sensor value and the back sensor value is greater than or equal to a preset threshold, the processor may determine the wearable mode as the downward mode. The downward mode means that the smart watch 400 is positioned on the back side of the wrist. For example, the downward mode means that the display of the smart watch 400 is positioned to face a direction of the palm on the wrist. Further, consider the case when the dial sensor value is almost equal to the back sensor value as shown in operation 605, then at operation 606, the wearable mode is determined as side mode. According to an embodiment of the present disclosure, when a difference between the dial sensor value and the back sensor value is less than a preset threshold, the processor may determine the wearable mode as the side mode. The side mode means that the smart watch 400 (specifically, the display of the smart watch) is positioned to face a direction of the side of the wrist on the wrist other than the upward and the downward modes. If there is no specific indication of dial sensor and back sensor values, then no wearable mode is determined as shown in operation 607.

According to an embodiment of the present disclosure, a reference specification of a pressure sensor provides details of various parameters such as but not limited to scan speed and surface pressure range. Based on the scan speed and the surface pressure range of the pressure sensor, "contact status" and "contact intensity level" values may be derived.

FIG. 6C illustrates an example of specification information of pressure sensors according to an embodiment of the present disclosure.

Referring to FIG. 6C, various concrete parameters which may be collected from the pressure sensors are shown. According to various embodiments of the present disclosure, among the parameters, a scan speed and a surface pressure range may be used as main parameters. Based on a nano technology, the parameters may be used with various hardware sensors.

Figure 7A:
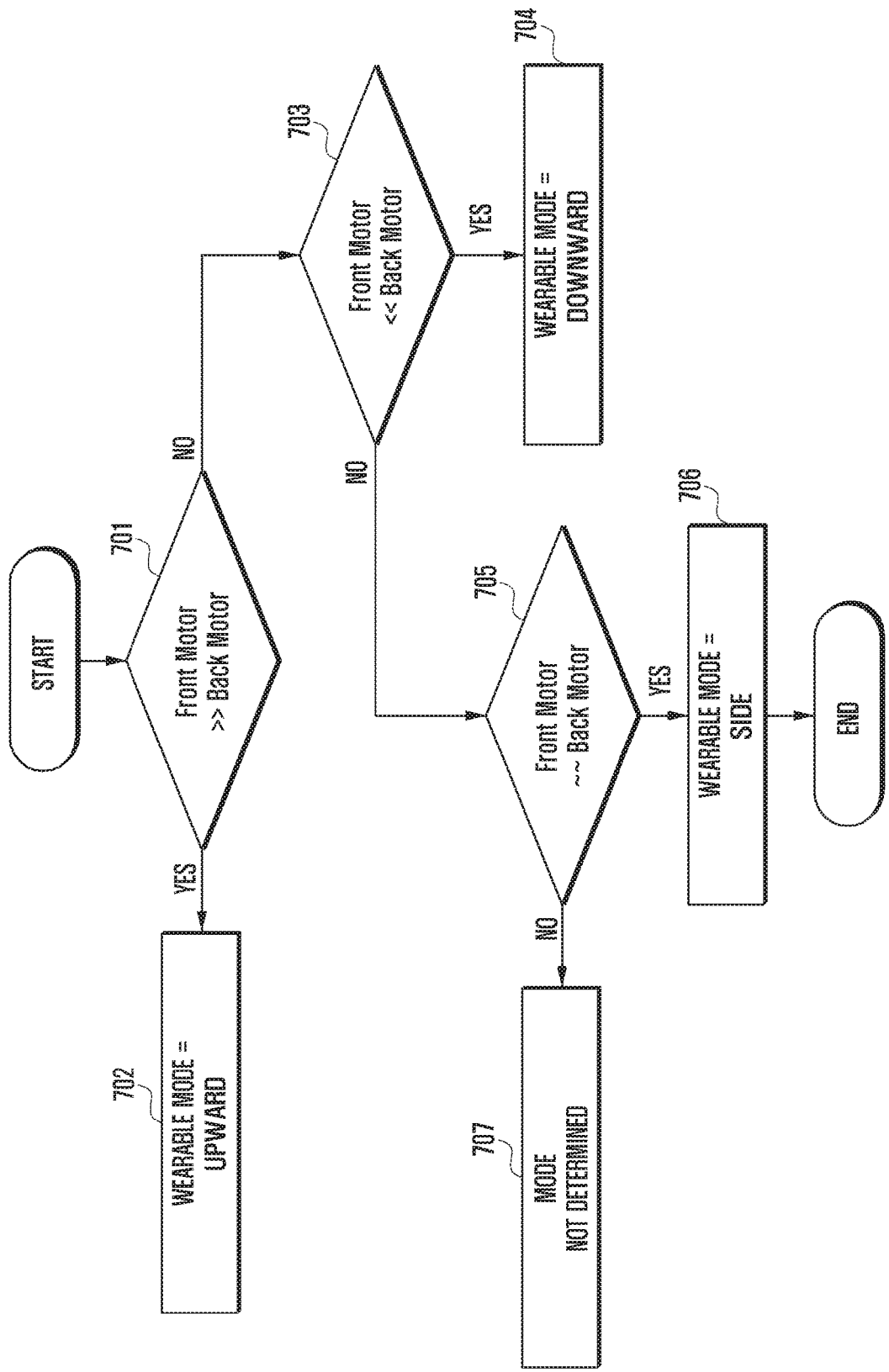
FIG. 7A is a flow chart of a method of determining different wearable modes of a wearable smart watch according to an embodiment of the present disclosure.

FIG. 7A is a flow chart of a method of determining different wearable modes of a smart watch according to an embodiment of the present disclosure. Consider the case, when a vibrating motor is used as a sensor in order to detect the wearable mode of the smart watch. A front motor includes a set of the vibrating motor configured at the back of the dial of the smart watch and a back motor includes a set of the vibrating motor configured to the strap of the smart watch 400. These vibrating motors may be located at smart watch in FIG. 7B.

Figure 7B:
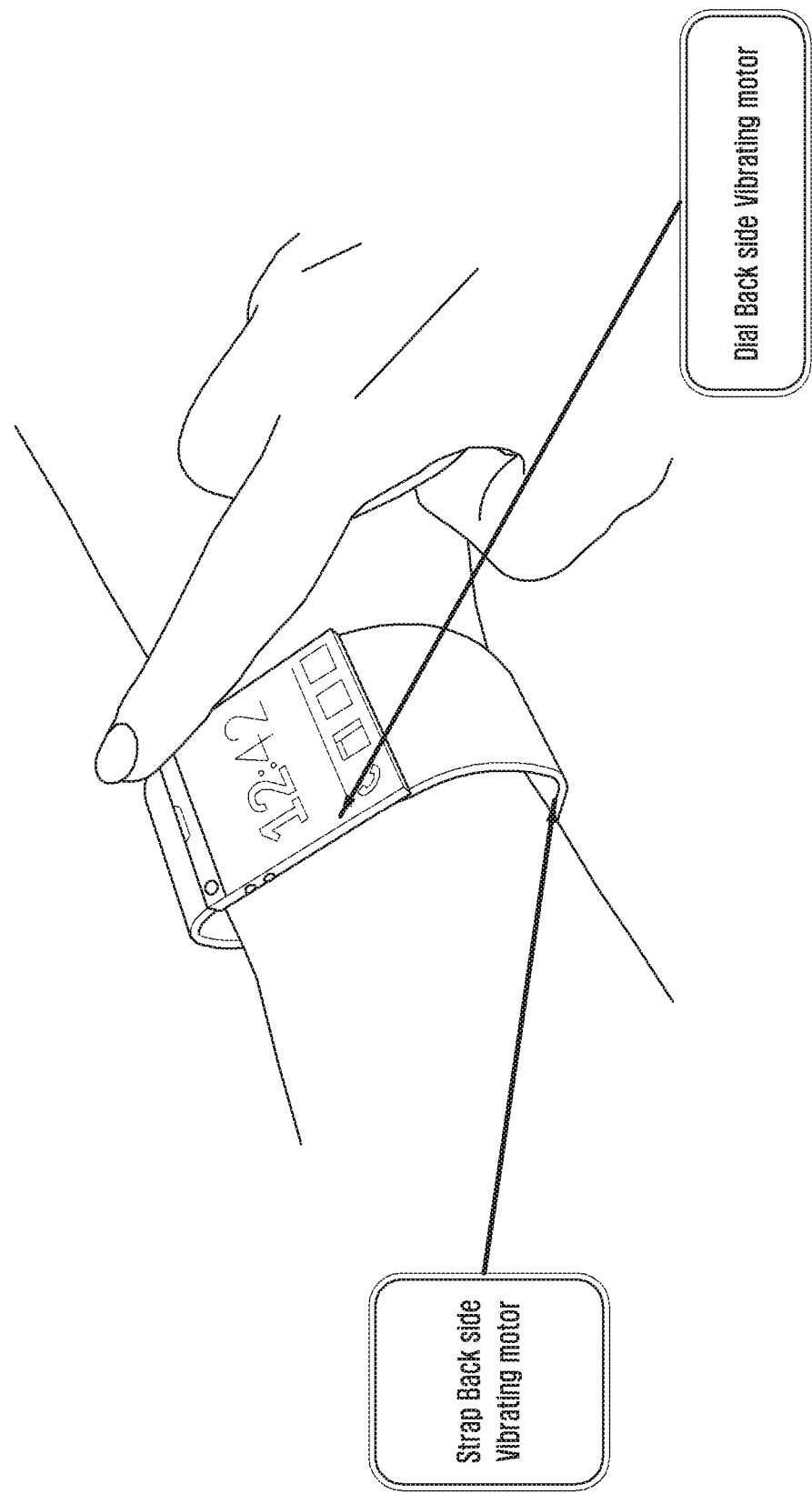
FIG. 7B illustrates an example of a smart watch including vibrating devices of FIG. 7A according to an embodiment of the present disclosure.

FIG. 7B illustrates an example of smart watch including vibrating devices of FIG. 7A according to an embodiment of the present disclosure.

Referring to FIGS. 7A and 7B, at operation 701, it is determined that, whether the front motor vibration output value is less than that of back motor vibration output value. If the vibration output value of front motor is greater than that of the back motor vibration output value, the wearable mode is determined as upward mode at operation 702. According to an embodiment of the present disclosure, if the vibration output value of front motor is greater than the vibration output value of back motor and a difference between the vibration output value of front motor and the vibration output value of back motor is greater than or equal to a preset threshold, the processor may determine the wearable mode as the upward mode. The upward mode means that the smart watch 400 is positioned on the upper side of the wrist. For example, the upward mode means that the display of the smart watch 400 is positioned to face a direction of the back of the hand on the wrist. On the other hand, if the front motor vibration output value is less than that of the back motor vibration output value in operation 703, the wearable mode is detected as downward mode at operation 704. According to an embodiment of the present disclosure, if the vibration output value of front motor is less than the vibration output value of back motor and a difference between the vibration output value of front motor and the vibration output value of back motor is greater than or equal to the preset threshold, the processor may determine the wearable mode as the downward mode. The downward mode means that the smart watch 400 is positioned on the back side of the wrist. For example, the downward mode means that the display of the smart watch 400 is positioned to face a direction of the palm on the wrist. Further, consider a case when the front motor vibration output value is almost equal to the back motor vibration output value as shown in operation 705, then at operation 707, the wearable mode is determined as side mode. According to an embodiment of the present disclosure, when a difference between the vibration output value of front motor and the vibration output value of back motor is less than the preset threshold, the processor may determine the wearable mode as the side mode. The side mode means that the smart watch 400 is positioned to face a direction of the side of the wrist on the wrist other than the upward and the downward modes. If there is no output values are received from the front motor and back motor, then no wearable mode is determined as shown in operation 706.

Although the wearable devices illustrated in FIGS. 6A and 7A determine the wearable mode through the pressure sensor and the vibration device, respectively, the present disclosure is not limited thereto. For example, the wearable device may determine the wearable mode through a combination of the pressure sensor and the vibration device.

It is assumed that the process of comparing the sensor values in FIGS. 6A and 7A is performed based on positioning of the user's hand. When the positioning of the user's hand is as illustrated in FIG. 5D, a sign of inequality in the comparison process of FIGS. 6A and 7A may change. For example, when a direction of the body (dial) on the wrist is a palm direction in a state where the positioning of the user's hand corresponds to a state of FIG. 5D, signs of inequality in operations 601, 603, 701, and 703 of FIGS. 6A and 7A reverse. Accordingly, the processor of the wearable device may additionally consider positioning information of the user's hand on which the wearable device is worn in order to determine the wearable mode.

Figure 8A:
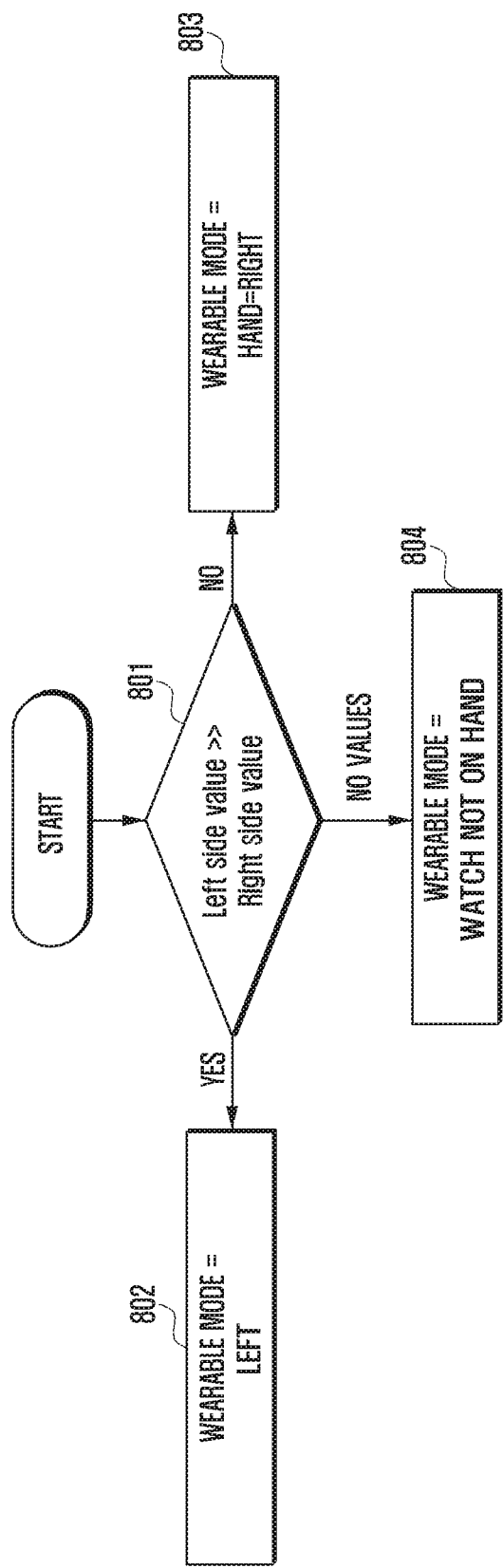
FIG. 8A is a flow diagram of a method of determining a wearable hand of a wearable device according to an embodiment of the present disclosure.

FIG. 8A is a flow diagram of a method of determining user's hand on which a smart device such as a smart watch is worn according to an embodiment of the present disclosure.

Figure 8B:
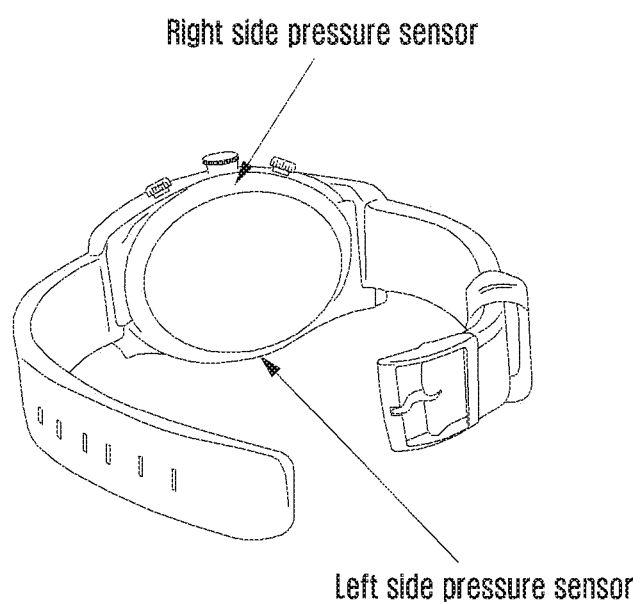
FIG. 8B illustrates an example of smart watch including pressure sensors of FIG. 8A according to an embodiment of the present disclosure.

FIG. 8B illustrates an example of smart watch including pressure sensors of FIG. 8A according to an embodiment of the present disclosure.

Referring to FIGS. 8A and 8B, by detecting the hand on which the user is wearing the smart watch 400, various gestures may be realized, based on which the user may implement a wide variety of actions on the smart watch 400. This detection may be made using one or more sets of sensors located at different parts/sections of smart watch 400 specially designed to provide sensor outputs relevant to detect the hand wearing the smart watch 400. For instance, consider that a third set of sensors and a fourth set of sensors are configured on left and right sides of the back side of the smart watch 400, respectively where the sensors are not aligned with orientation of strap of the smart watch 400. These the third set of sensors and the fourth set of sensors may be located at the smart watch 400 in FIG. 8B. At operation 801, output signals received from the third set of pressure sensors and the fourth set pressure sensors are compared with each other. When the smart watch 400 is worn on the left hand, a diameter of the wrist in the left side of the smart watch 400 is greater than a diameter of the wrist in the right side of the smart watch 400 from a viewpoint of the user. Accordingly, an output signal of a left pressure sensor of the smart watch 400 is greater than an output signal of a right pressure sensor. Based on such a principle, if the output signal of the third set of pressure sensor is greater than the output signal of the fourth set of pressure sensor, the processor of the smart watch 400 determines that the hand on which smart watch 400 is being worn is a left hand in operation 802. Based on the same principle, if the output signal of the third set of pressure sensor is less than the output of the fourth set of pressure sensor, the hand on which smart watch 400 is being worn is a right hand in operation 803. If no output signals received from the third set of pressure sensor and the fourth set of pressure sensor, the processor of the smart watch 400 is not worn on either hand in 804. Further, since the vibration device may determine the output value by using a pressure parameter, the vibration device may be used instead of the pressure sensor based on the same principle used by the pressure sensor.

Figure 9A:
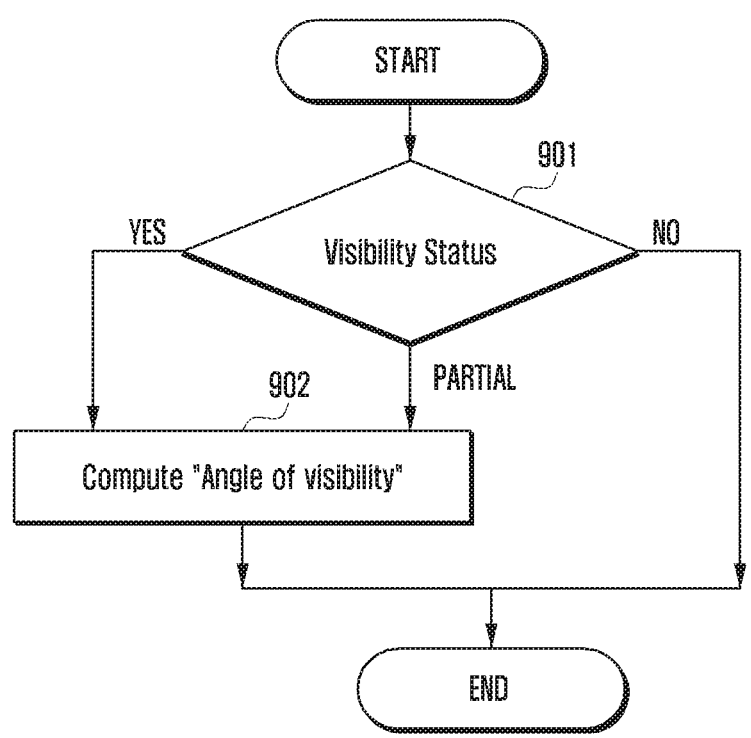
FIG. 9A is a flow chart of a method of computing the angle of visibility according to an embodiment of the present disclosure.

FIG. 9A illustrates a flow chart of a method of computing the angle of visibility of the smart watch according to an embodiment of the present disclosure.

FIG. 9B indicates the visibility status at different wearable modes and wearable positions according to an embodiment of the present disclosure.

Referring to FIGS. 9A and 9B, the status of visibility is based on the wearable position, turn position and wearable hand of a smart watch. The visibility status and angle of visibility may be considered as derived parameters from the basic parameters such as wearable position, a turn position and a wearable hand. The visibility status indicates whether the smart watch 400 is visible to user or not. The angle of visibility indicates that the angle at which the smart watch 400 is visible to the user. In an embodiment, in order to calculate the angle of visibility the wearable mode, wearable hand and turn position are used. In another embodiment, additional parameters such as Driving mode may be used optionally to arrive at the angle of visibility in addition to the mentioned parameters. The driving mode includes, but not limited to, Bike, Car, and the like. In a preferred embodiment, the turn position is used to calculate the angle of visibility.

In FIG. 9B, visibility status may also be marked as PARTIAL, in addition to YES and NO, to compute the angle of visibility.

The visibility status changes on the bases of the hand wearing the smart watch 400, wearable mode and hand turn position. An example for the visibility status is shown in FIGS. 5A to 5D. Similarly but not limited to, if a smart device is being worn on a right hand, downward position, the visibility status would change accordingly.

In FIG. 9A, the visibility status is determined at operation 901. The angle of visibility is determined when the visibility status is either partial or full as shown in operation 902. The smart watch 400 is configured to adjust visibility status and an angle of visibility of the display of the smart watch 400 on the basis of a driving mode. For example, the angle of visibility may be calculated by additionally considering that the user selects one of the driving modes in a setting screen of the wearable device and the driving mode includes one of a car deriving mode and bike driving mode. Based on the visibility status and the angle of visibility, the processor of the wearable device may control the display such that the displayed screen is visible by the user as much as possible. The control may include an operation of re-arranging a user interface (UI) layout.

Figure 10:
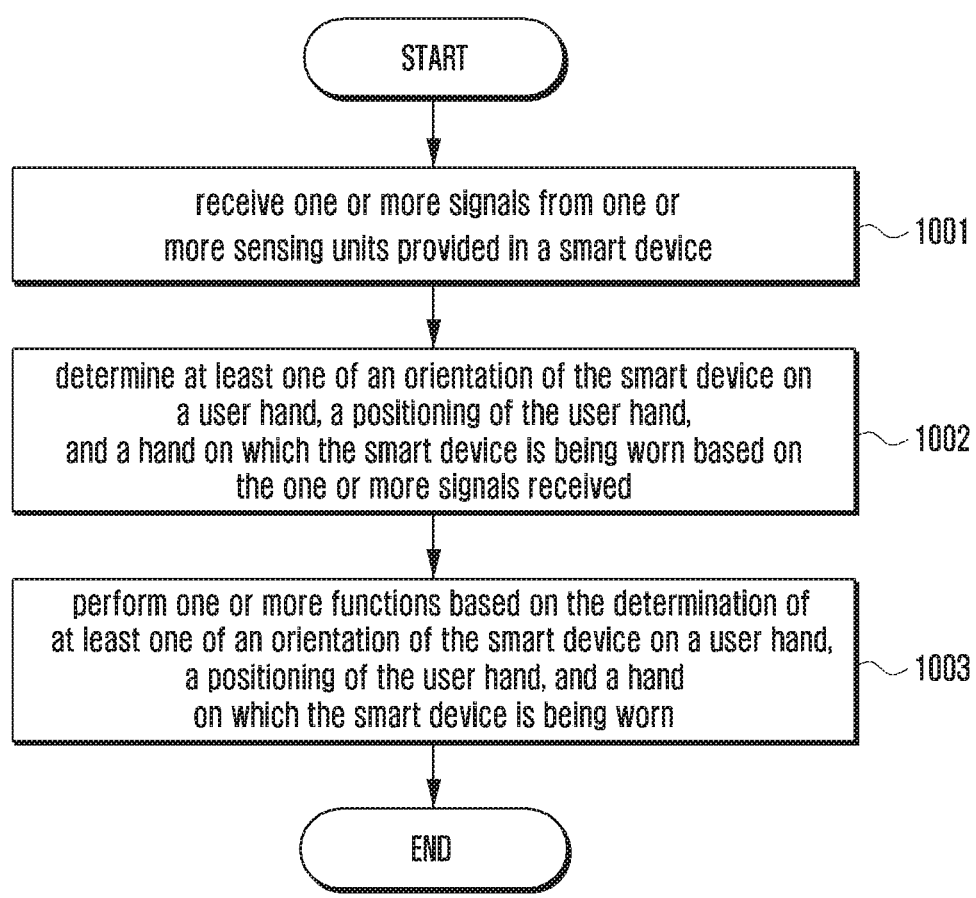
FIG. 10 is a flow diagram of a method of providing user interaction with a wearable device according to an embodiment of the present disclosure.

FIG. 10 illustrates a flow diagram of a method of providing user interaction with a smart device such as a smart watch according to an embodiment of the present disclosure.

Referring to FIG. 10, at operation 1001, one or more signals are received from one or more sensing units in the smart watch 400. At operation 1002, an orientation of the display of the smart device on a user hand, a positioning of the user hand, and/or a hand on which the smart device is being worn is determined. The orientation of the smart watch 400 on a user hand is determined by at least one set of pressure sensors. The orientation of the display of the smart watch 400 is determined by comparing output signals received from the first set of pressure sensors and the second set of pressure sensors. If the output signal of the first set of pressure sensor is greater than the output signal of the second set of pressure sensors, the smart watch 400 orientation is upward. If the output signal of the first set of pressure sensors is lesser than the output signal of the second set of pressure sensors, the smart watch 400 orientation is downward. Further, if a difference between the output signal of the first set of pressure sensor and the output signal of the second set of pressure sensor is less than or equal to a preset threshold, the smart watch 400 orientation is towards the user or the opposite of the user other than the upward and the downward.

According to an aspect of the present disclosure, the position of the user hand is determined by configuring gyroscope in the smart watch 400 to ascertain the hand position.

The hand on which the smart watch 400 is being worn is determined by at least one set of pressure sensors. This involves comparing output signals received from the third set of pressure sensor and the fourth set pressure sensor. If the output signal of the third set of pressure sensor is greater than the output signal of the fourth set of pressure sensor, the hand on which smart watch 400 is being worn is a left hand.

If the output signal of the third set of pressure sensor is less than the output of the fourth set of pressure sensor, the hand on which smart watch 400 is being worn is a right hand. On the other hand, if no output signals received from the third set of pressure sensor and the fourth set of pressure sensor, the smart watch 400 is not worn on either hand.

At operation 1003, one or more functions are performed based on the determination of at least one of an orientation of the smart device on a user hand, a positioning of the user hand, and a hand on which the smart device is being worn.

Figure 11:
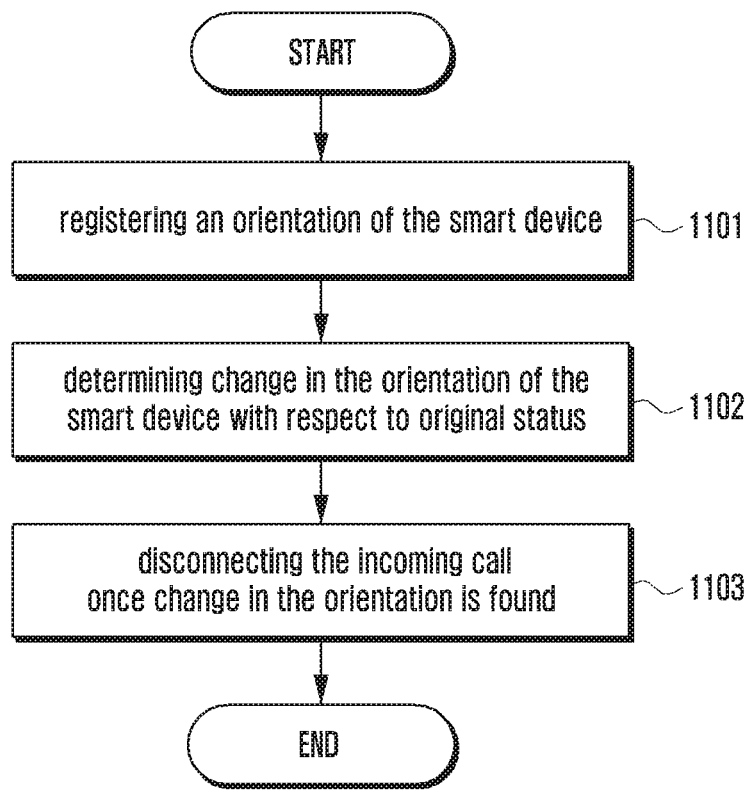
FIG. 11 is a flow diagram of a method of providing user interaction with a wearable device according to an embodiment of the present disclosure.

FIG. 11 illustrates a flow diagram of a method of providing user interaction with a smart watch 400 according to an embodiment of the present disclosure.

Referring to FIG. 11, various functions may be performed based on the obtained orientation of the smart device, positioning of hand, and hand on which the smart device is worn aforementioned FIGS. 6 to 10. The orientation of the smart watch 400 is registered at operation 1101. The change of orientation of the smart watch 400 with respect to the original status is determined at operation 1102. The incoming call is disconnected once the change in the orientation of the smart watch 400 determined at operation 1103. According to an embodiment of the present disclosure, in order to perform one or more functions, the wearable device may register information on at least one of the wearable mode, positioning of the user's hand, and the hand on which the wearable device is worn in the memory. The wearable device may recognize at least one of a change in the orientation of the display, a change in the positioning of the user's hand, and a change in the hand on which the wearable device is worn based on the registered information. The wearable device may perform various functions as well as the function of FIG. 11 according to the changes. The various functions will be described in detail with reference to FIGS. 13, 14, and 17 to 22.

Figure 12:
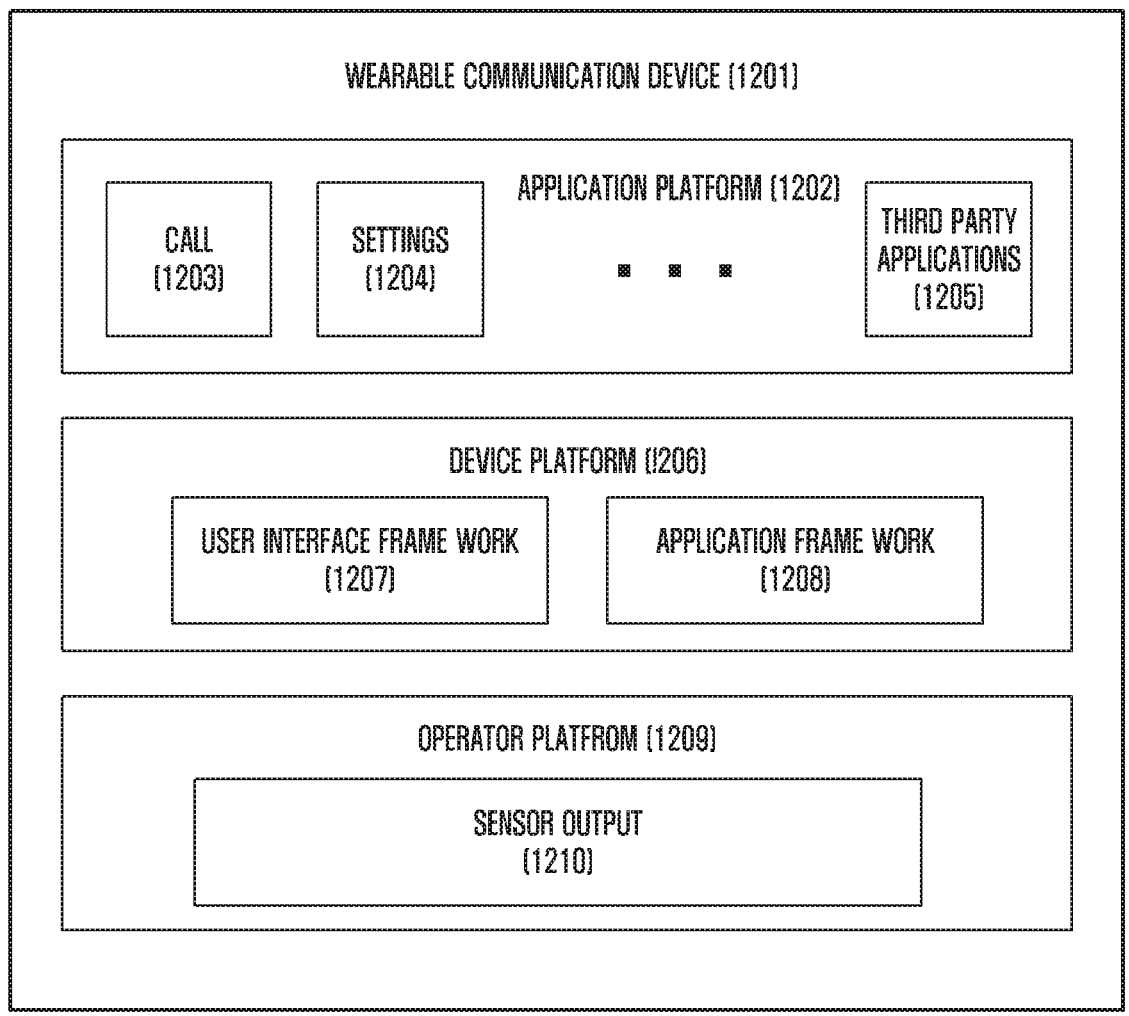
FIG. 12 illustrates a block diagram of a wireless communication device (i.e., a wearable device) according to an embodiment of the present disclosure.

FIG. 12 illustrates a block diagram of a smart device according to an embodiment of the present disclosure.

Referring to FIG. 12, the smart device 400 is a wearable communication device 1201 includes an operator platform 1209, device platform 1206 and an application platform 1202. The operating platform 1209 collects the input from the pressure sensors and vibrating sensors 1210 attached to the smart device. The device platform 1206 includes a user interface frame work 1207 and an application framework 1208. The application platform 1202 includes a call 1203, settings 1204 and third party applications 1205.

The sensor inputs need to be collected at the operating device drivers in order to derive the basic parameters. Then the application framework to derive the basic parameters based on sensor inputs. A UI Framework needs to make use of the application framework parameters and determine UI Framework parameters. All the basic parameters and derived parameters to be exposed as application programming interfaces (APIs) in software development toolkit (SDK) for preloaded and downloadable applications. Along with the parameters exposed to applications, change in parameters to be presented to applications as events.

Figure 13:
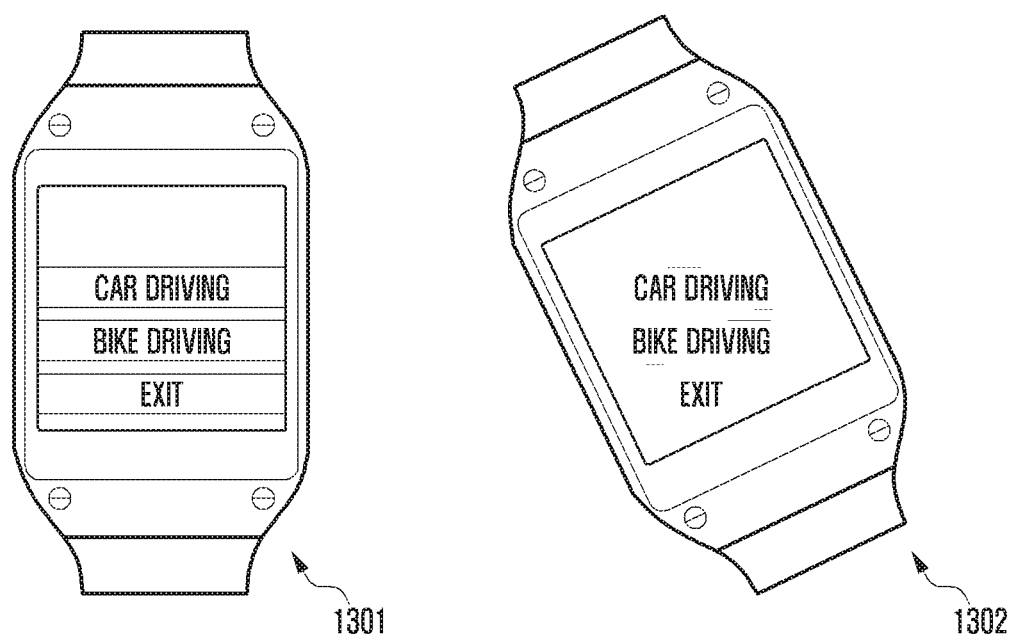
FIG. 13 illustrates the orientation of a display of the wearable device in order to provide appropriate visibility to a user according to an embodiment of the present disclosure.

FIG. 13 illustrates the orientation of a display of the smart watch 400 in order to provide appropriate visibility to the user according to an embodiment of the present disclosure.

Referring to FIG. 13, a smart watch or a smart device is configured according to the user requirement for providing clear visibility of the display/dial of the smart watch. Functions of a landscape mode and a portrait mode of the portable terminal according to the related art may be expanded by various embodiments of the present disclosure. The smart watch 400 may perform a UI re-layout operation according to a user environment. For example, when the processor of the smart watch 400 recognizes switching from a screen 1301 to a screen 1302, the processor may control the UI layout of the display to be the screen 1302 while maintaining a UI environment of the screen 1301. In this case, the processor of the smart watch 400 may recognize the switching from the screen 1301 to the screen 1302 based on at least one of the wearable mode, the positioning of the user's hand, the hand on which the wearable device is worn.

The visibility status and angle of visibility of the display/dial of the smart watch are determined based on the parameters such as wearable position, turn position and wearable hand. The visibility status indicates whether the smart watch 400 is visible to user or not. The angle of visibility indicates an angle at which the display/dial of the smart watch 400 is visible to the user. In an embodiment of the present disclosure, additional parameter such as driving mode is used to determine the angle of visibility in addition to aforementioned parameters. The driving mode in the smart device is activated on detecting that a user wearing the smart device is driving an automobile such as a car or a bike. In an embodiment of the present disclosure, the turn position is used to calculate the angle of visibility of the display of the smart watch.

Figure 14A:
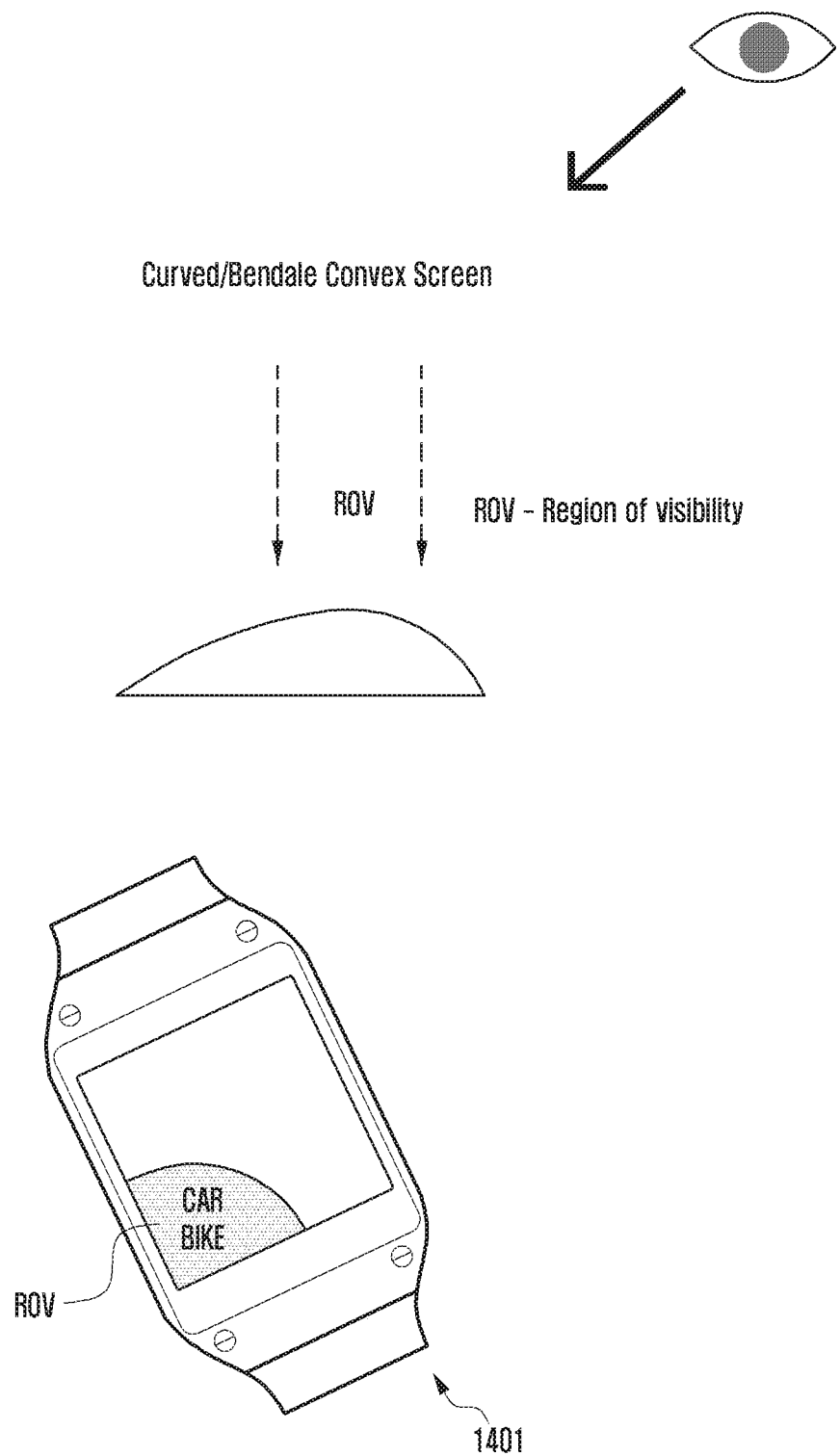

FIGS. 14A and 14B illustrate various types of screens of the smart watch according to an embodiment of the present disclosure.

Referring to FIGS. 14A and 14B, the screen of the smart watch may be curved convex or curved concave. In a case of the convex screen illustrated in FIG. 14A, the processor of the smart watch may re-lay out the UI screen so that a menu 1401 is positioned in a Region Of Visibility (ROV) from a viewpoint of the user. In a case of the concave screen illustrated in FIG. 14B, the processor of the smart watch may re-lay out the UI screen so that a menu 1402 is positioned in the ROV. By the types of screens and the UI re-layout operation, an ROV is a display of a bend type device such as a smart watch may be further secured.

Moreover, the smart watch screen may have flexible bendable display screen which changes from flat, convex and concave shape depending on the sensor inputs.

According to an aspect of the present disclosure, the screen of the smart watch may be bendable convex or bendable concave.

Figure 15A:
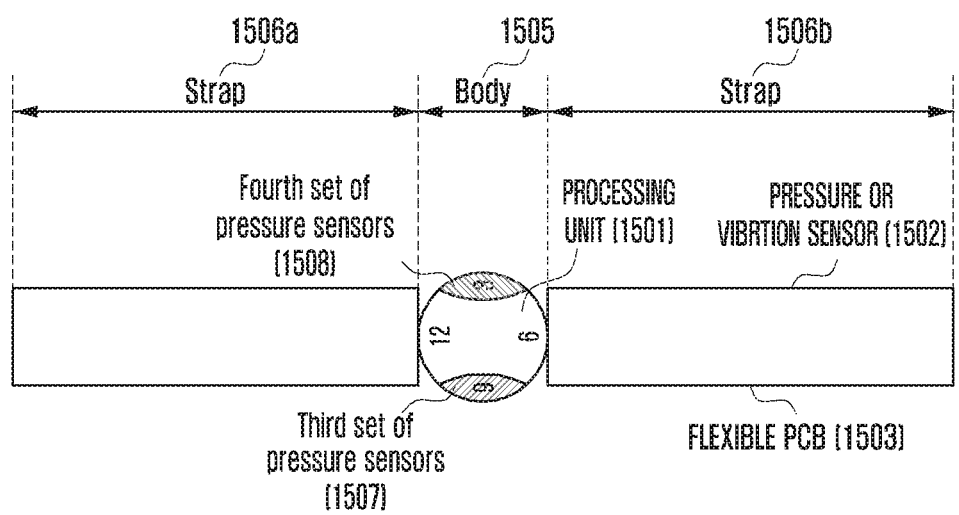
FIGS. 15A and 15B illustrate coupling provisions of one or more sensors with a processing unit in a smart watch according to various embodiments of the present disclosure.
Figure 15B:
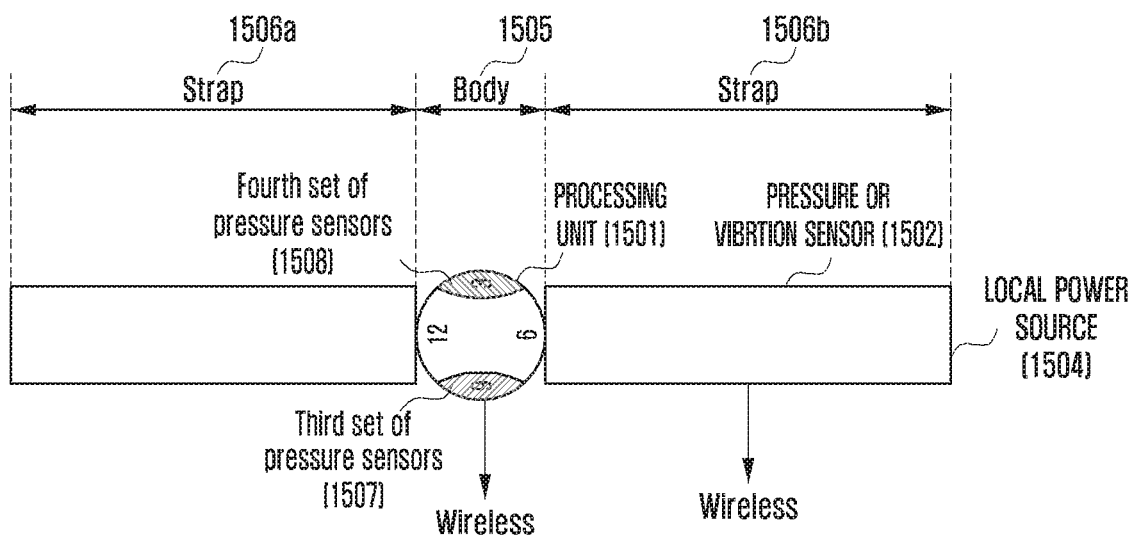

FIGS. 15A and 15B illustrate coupling provisions of one or more sensors with a processing unit such as a processor in a smart watch according to various embodiments of the present disclosure.

Referring to FIGS. 15A and 15B, a smart watch including one or more sensors 1502 and a processing unit 1501 may be divided into physical regions of a body 1505 and straps 1506a and 1506b. The processing unit 1501 may be included in the body 1505. Also, the third set of pressure sensors 1507 and the fourth set of pressure sensor 1508 may be included in the body 1505.

In an embodiment of the present disclosure, the sensors 1502 are coupled with the processing unit 1501 through flexible printed circuit board (PCB) 1503 as illustrated in FIG. 15A. Sensors are activated based on inputs from other sensors like accelerometer (or) given directly based on threshold decided at strap sensor.

In an embodiment of the present disclosure, the sensors 1502 are coupled with the processing unit 1501 wirelessly as illustrated in FIG. 15B. Sensors are activated based on inputs from other sensors like an accelerometer (or) given directly based on threshold decided at a strap sensor. For functioning of the wireless module at the strap, there is a need for a local power source 1504.

The sensors attached to the dial and the strap of the smart watch according to present disclosure may be coupled via multiple ways with the processing unit. The processing unit 1501 is configured in the dial of the smart watch. The pressure and the vibrating sensors 1502 are located in the strap as well as the dial of the smart watch.

Figure 16:
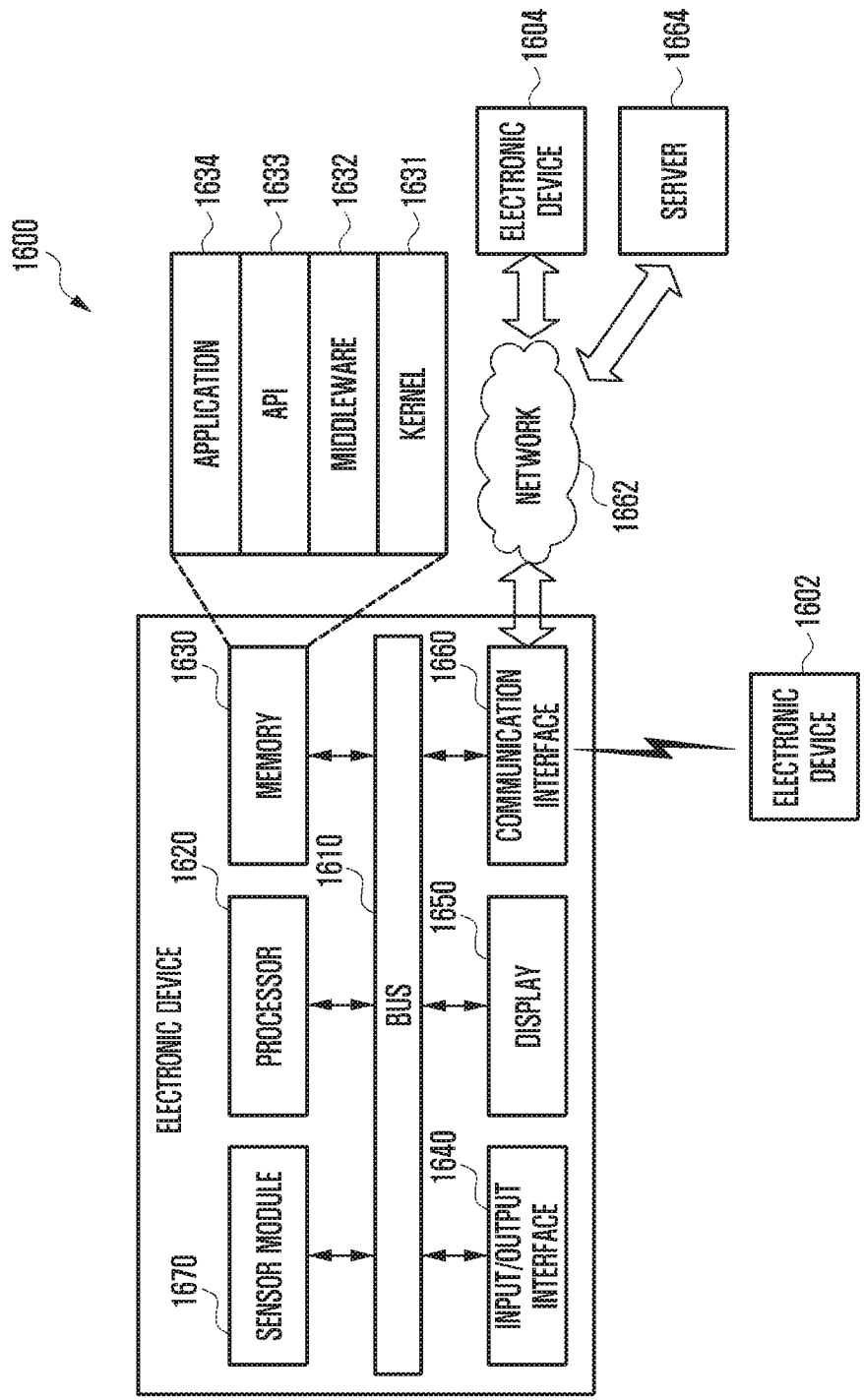
FIG. 16 illustrates a block diagram of a wearable device according to an embodiment of the present disclosure.

FIG. 16 illustrates a network environment including an electronic device according to various embodiments of the present disclosure.

Referring to FIG. 16, an electronic device 1600 may include a bus 1610, a processor 1620, memory 1630, an input-output interface 1640, a display 1650, a communication interface 1660, and a sensor module 1670, but is not limited thereto. The electronic device 1600 of FIG. 16 may include the whole or a part of component of wearable device of FIGS. 1 to 15.

The bus 1610 may be a circuit which interconnects the above-described elements and delivers a communication (e.g., a control message) between the above-described elements.

The processor 1620 may receive commands from the above-described other elements (e.g., the memory 1630, input/output interface 1640, the display module 1650, the communication module 1660, the sensor module 1670, and the like) through the bus 1610, may interpret the received commands, and may execute calculation or data processing according to the interpreted commands.

According to an embodiment of the present disclosure, the processor 1620 may receive one or more signals from the sensor module 1670. The processor may determine, based on the one or more signals, at least one of an orientation of the display 1650 of the electronic device 1600 on the user hand, a positioning of user hand, and a hand on which the electronic device 1600 is worn. For example, the processor 1620 may determine alignment of the electronic device 1600 based on the one or more signals. Further, the processor 1620 may perform one or more functions based on the determination.

According to an embodiment of the present disclosure, the processor 1620 may determine a direction of exposure of display 1650 on the user hand based on at least two sets of pressure sensors. These at least two sets of pressure sensors may comprise a first set of pressure sensors configured at body of the electronic device 1600 and a second set of pressure sensors configured at strap of the electronic device 1600.

According to an embodiment of the present disclosure, if the output value of the first set of pressure sensors is greater than the output value of the second set of pressure sensors and a difference between the output value of the first set of pressure sensors and the output value of the second set of pressure sensors is greater than or equal to a preset threshold, the processor 1620 may determine that a direction of the exposure of display 1650 is to face a direction of the back of the hand on the wrist.

According to an embodiment of the present disclosure, if the output value of the first set of pressure sensors is less than the output value of the second set of pressure sensors and a difference between the output value of the first set of pressure sensors and the output value of the second set of pressure sensors is greater than or equal to the preset threshold, the processor 1620 may determine that a direction of the exposure of display 1650 is to face a direction of palm of the hand on the wrist.

According to an embodiment of the present disclosure, if a difference between the output value of the first set of pressure sensors and the output value of the second set of pressure sensors is less than the preset threshold, the processor 1620 may determine that a direction of the exposure of display 1650 is to face a direction of the side of the wrist on the wrist.

According to an embodiment of the present disclosure, the processor 1620 may determine a direction of exposure of display 1650 on the user hand based on at least two sets of vibrating units instead of the at least two sets of pressure sensors in the same way. These at least two sets of vibrating units may comprise a first set of vibrating units configured at a body of the electronic device 1600 and a second set of vibrating units configured at a strap of the electronic device 1600.

According to an embodiment of the present disclosure, if the output signal of the first set of vibrating unit is greater than the output signal of the second set of vibrating unit and a difference between the output signal of the first set of vibrating unit and the output signal of the second set of vibrating unit is greater than or equal to a preset threshold, the processor may determine that the display 1650 is positioned to face a direction of the back of the hand on the wrist.

According to an embodiment of the present disclosure, if the output signal of the first set of vibrating unit is less than the output signal of the second set of vibrating unit and a difference between the output signal of the first set of vibrating unit and the output signal of the second set of vibrating unit is greater than or equal to the preset threshold, the processor determines that the display 1650 is positioned to face a direction of palm on the wrist.

According to an embodiment of the present disclosure, if a difference between the output signal of the first set of vibrating unit and the output signal of the second set of vibrating unit is less than the preset threshold, the processor determines that the display 1650 is positioned to face a direction of the side of the wrist on the wrist.

According to an embodiment of the present disclosure, the processor 1620 may determine a hand on which the electronic device 1600 is being worn through at least two sets of pressure sensors. At this point, a third set of pressure sensor and a fourth set of pressure sensor may be configured on left and right sides of a body of the electronic device 1600. Further, the third set of pressure sensor and the fourth set of pressure sensor may not be aligned with orientation of strap of the electronic device 1600.

According to an embodiment of the present disclosure, if the output signal of the third set of pressure sensors is greater than the output signal of the fourth set of pressure sensors, the processor 1620 may determine that the hand on which the electronic device 1600 is being worn is a left hand.

According to an embodiment of the present disclosure, if the output signal of the third set of pressure sensors is less than the output of the fourth set of pressure sensors, the processor 1620 determines that the hand on which the electronic device 1600 is being worn is a right hand.

According to an embodiment of the present disclosure, if no output signals are received from the third set of pressure sensor and the fourth set of pressure sensor, the processor 1620 may determine that the electronic device 1600 is not worn on either hand.

According to an embodiment of the present disclosure, the preset threshold is may be figured by the user or the electronic device 1600.

The memory 1630 may store therein commands or data received from or created at the processor 1620 or other elements (e.g., the input/output interface 1640, the display 1650, the communication interface 1660, or the sensor module 1670, and the like). The memory 1630 may include programming modules such as a kernel 1631, a middleware 1632, an API 1633, and an application 1634. Each of the programming modules may be composed of software, firmware, hardware, and any combination thereof.

According to various embodiments, memory 1630 may store various sensor values (e.g., gyroscope sensor value, pressure sensor value, and vibrating sensor value) from the sensor module 1670. Also, the memory 1630 may store visibility status and degree of visibility calculated in operation 902 of FIG. 9A. further, the memory 1630 may store various User Interfaces to be outputted based on user input gestures The kernel 1631 may control or manage system resources (e.g., the bus 1610, the processor 1620, or the memory 1630, and the like) used for performing operations or functions of the other programming modules, e.g., the middleware 1632, the API 1633, or the application 1634. Additionally, the kernel 1631 may offer an interface that allows the middleware 1632, the API 1633 or the application 1634 to access, control or manage individual elements of the electronic device 1600.

The middleware 1632 may perform intermediation by which the API 1633 or the application 1634 communicates with the kernel 1631 to transmit or receive data. Additionally, in connection with task requests received from the applications 1634, the middleware 1632 may perform a control (e.g., scheduling or load balancing) for the task request by using technique such as assigning the priority for using a system resource of the electronic device 1600 (e.g., the bus 1610, the processor 1620, or the memory 1630, and the like) to at least one of the applications 1634.

The API 1633 which is an interface for allowing the application 1634 to control a function provided by the kernel 1631 or the middleware 1632 may include, for example, at least one interface or function (e.g., a command) for a file control, a window control, an image processing, a text control, and the like.

According to embodiments, the application 1634 may include a Short Message Service (SMS)/Multimedia Message Service (MMS) application, an email application, a calendar application, an alarm application, a health care application (e.g., an application for measuring quantity of motion or blood sugar), an environment information application (e.g., an application for offering information about atmospheric pressure, humidity, or temperature, and the like), and the like. Additionally or alternatively, the application 1634 may be an application associated with an exchange of information between the electronic device 1600 and any external electronic device (e.g., an external electronic devices 1602, 1604). This type application may include a notification relay application for delivering specific information to an external electronic device, or a device management application for managing an external electronic device.

For example, the notification relay application may include a function to deliver notification information created at any other application of the electronic device 1600 (e.g., the SMS/MMS application, the email application, the health care application, or the environment information application, and the like) to an external electronic device (e.g., the external electronic devices 1602, 1604). Additionally or alternatively, the notification relay application may receive notification information from an external electronic device (e.g., the external electronic devices 1602, 1604) and offer the notification information to a user. The device management application may manage (e.g., install, remove or update) a certain function (a turn-on/turn-off of an external electronic device (or some components thereof), or an adjustment of brightness (or resolution) of a display) of any external electronic device (e.g., the external electronic device 1602, 1604) communicating with the electronic device 1600, a certain application operating at such an external electronic device, or a certain service (e.g., a call service or a message service) offered by such an external electronic device.

According to various embodiments of the present disclosure, the application 1634 may include a specific application specified depending on attributes (e.g., a type) of an external electronic device (e.g., the external electronic devices 1602, 1604). For example, in case an external electronic device is an MP3 player, the application 1634 may include a specific application associated with a play of music. Similarly, in case an external electronic device is a portable medical device, the application 1634 may include a specific application associated with a health care. In an embodiment of the present disclosure, the application 1634 may include at least one of an application assigned to the electronic device 1600 or an application received from an external electronic device (e.g., the server 1664 or the external electronic devices 1602, 1604).

The input/output interface 1640 may deliver commands or data, entered by a user through an input/output unit (e.g., a sensor, a keyboard, or a touch screen), to the processor 1620, the memory 1630, the communication interface 1660, or the sensor module 1670 via the bus 1610. For example, the input/output interface 1640 may offer data about a user's touch, entered through the touch screen, to the processor 1620. Also, through the input/output unit (e.g., a speaker or a display), the input/output interface 1640 may output commands or data, received from the processor 1620, the memory 1630, the communication interface 1660, or the sensor module 1670 via the bus 1610. For example, the input/output interface 1640 may output voice data, processed through the processor 1620, to a user through the speaker.

The display 1650 may display thereon various kinds of information (e.g., multimedia data, text data, and the like) to a user.

According to an embodiment of the present disclosure, the display 1650 may comprise at least one of a curved convex screen and curved concave screen to provide the visibility to the user in a bend position.

According to an embodiment of the present disclosure, the display 1650 may comprise at least one of a flexible bendable display screen for providing one of a flat shape screen, convex shape screen and concave shape screen depending upon the signals received from sensors.

The communication interface 1660 may perform a communication between the electronic device 1600 and any external electronic device (e.g., the electronic device 1604 of the server 1664). For example, the communication interface 1660 may communicate with any external device by being connected with a network 1662 through a wired or wireless communication. A wireless communication may include, but not limited to, at least one of Wi-Fi, Bluetooth (BT), Near Field Communication (NFC), Global Positioning System (GPS), or a cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM), and the like). A wired communication may include, but not limited to, at least one of Universal Serial Bus (USB), High Definition Multimedia Interface (HDMI), Recommended Standard 232 (RS 232), or Plain Old Telephone Service (POTS).

According to an embodiment of the present disclosure, the network 1662 may be a communication network, which may include at least one of a computer network, an internet, an internet of things, or a telephone network. According to an embodiment of the present disclosure, a protocol (e.g., transport layer protocol, data link layer protocol, or physical layer protocol) for a communication between the electronic device 1600 and any external device may be supported by at least one of the application 1634, the API 1633, the middleware 1632, the kernel 1631, or the communication interface 1660.

According to an embodiment of the present disclosure, the server 1664 may perform at least one of operations (or functions) implemented in the electronic device 1600 to support the operation of the electronic device 1600.

The sensor module 1670 may measure a physical quantity and/or may detect an operating state of the electronic device 1600, and may convert the measured or detected information to an electrical signal. The sensor module 1670 may include at least one of gyroscope sensor, pressure sensor, and vibrating sensor. Sensors included in the sensor module 1670 are configured at specific location of body of the electronic device 1600 or strap of the electronic device 1600 depicted in FIG. 15.

Figure 17A:
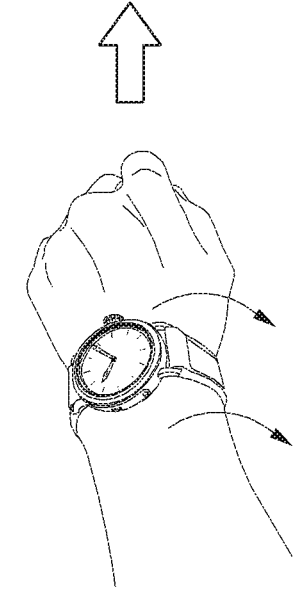
FIGS. 17A, 17B, and 17C illustrate examples of an operation in which a wearable device performs a particular function according to a user interaction according to various embodiments of the present disclosure.
Figure 17B:
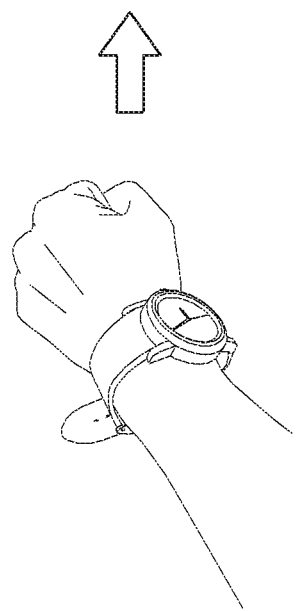
Figure 17C:
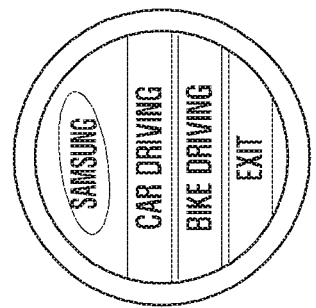

FIGS. 17A, 17B, and 17C illustrate examples of an operation in which the wearable device performs a particular function according to a user interaction according to various embodiments of the present disclosure.

Referring to FIG. 17A-17C, a user may input a gesture of tilting the display of the smart watch from a direction of the back of the hand to a direction of the side of wrist, and the processor of the smart watch may display an inquiry screen of a driving mode in response to the input of the gesture. The processor may support embodiments of the present disclosure disclosed in FIGS. 19 to 22 according to a driving mode environment selected in response to reception of an input for selecting one of the driving modes from the user.

An additional parameter such as the driving mode may be used with the aforementioned parameters to determine an angle of visibility. The driving mode of the smart watch is activated at an operation in which the user wearing the smart device drives a vehicle such as a car or a bike. The detection operation may be performed by recognition of the selection of a particular driving mode in a setting screen of the wearable device by the user. The user may select the driving mode by tilting the display of the smart watch 400 in one direction (for example, upwardly or downwardly) in the status illustrated in FIGS. 17A to 17C. According to an embodiment of the present disclosure, a turn position is used to calculate the angle of visibility of display of the smart watch.

FIG. 18 illustrates an example of a structure of a visibility status of the wearable device in a car or a bike according to an embodiment of the present disclosure.

Referring to FIG. 18, in a car driving mode and when the display of the smart watch is positioned to face a palm direction, the smart watch is in the visibility status as illustrated in a screen 1810. In a bike driving mode and when the display of the smart watch is positioned to face a direction of the back of the hand on the wrist, the smart watch is in the visibility status as illustrated in a screen 1820.

Figure 19:
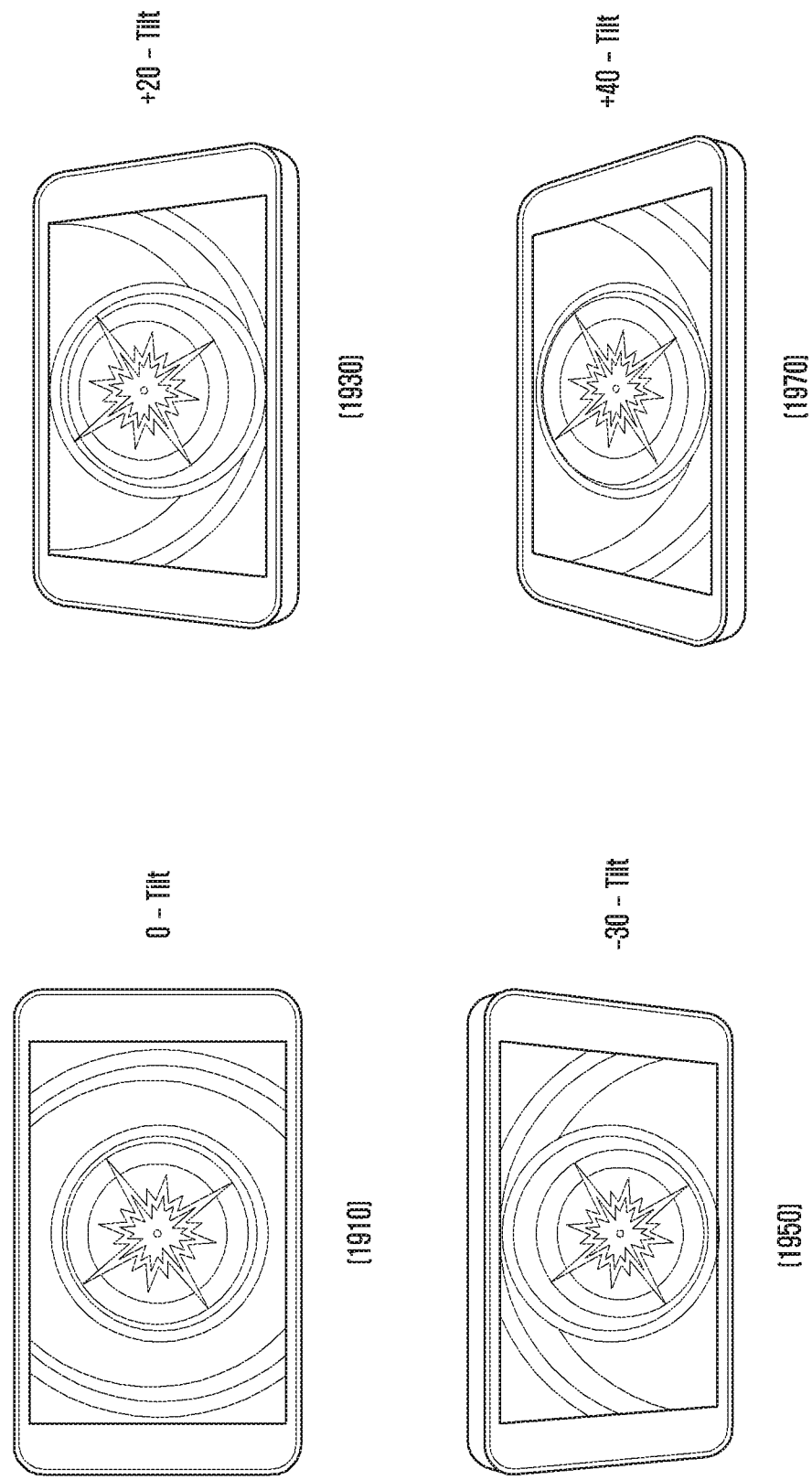
FIG. 19 illustrates an example of an operation in which a wearable device performs a particular function according to a user interaction in a visibility status according to an embodiment of the present disclosure.

FIG. 19 illustrates an example of an operation in which the wearable device performs a particular function according to a user interaction in a visibility status according to an embodiment of the present disclosure.

Referring to FIG. 19, a screen 1910 shows a case where the wearable device does not tilt. As the wearable device tilts at +20 degrees during the driving, the wearable device may re-lay out a UI screen from the screen 1910 to a screen 1930. As the wearable device tilts at −30 degrees, the wearable device may re-lay out the UI screen from the screen 1910 to a screen 1950. As the wearable device tilts at +40 degrees, the wearable device may re-lay out the UI screen from the screen 1910 to a screen 1970. The wearable device may calculate an appropriate angle of visibility based on parameters related to positioning (turn position) of the user's hand and the hand on which the wearable device is worn. The wearable device may re-lay out the UI screen based on the calculated angle of visibility. Also, the wearable device may control sizes, colors, brightness, and layouts of UI items based on the calculated angle of visibility. By the UI re-layout operation, the user who is driving may receive the UI screen which is properly re-laid out according to a motion of the hand.

Figure 20:
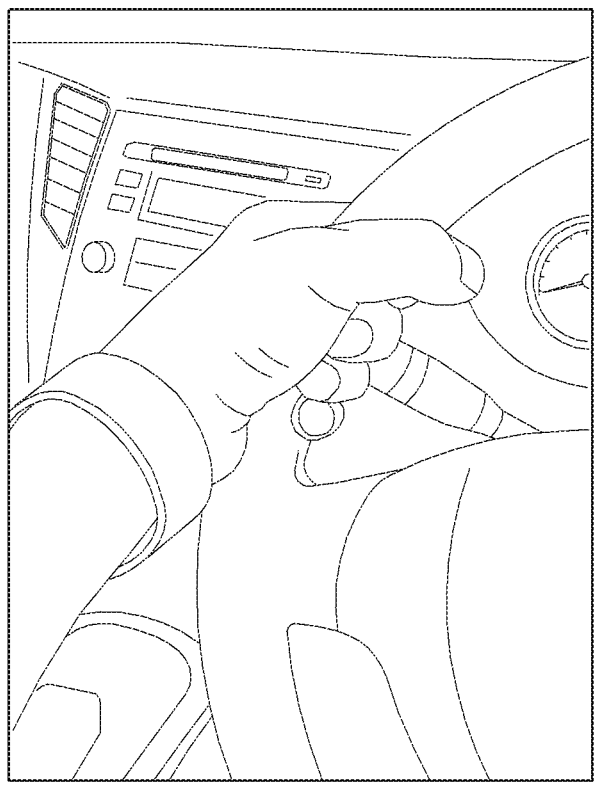
FIG. 20 illustrates an example of a composition in which a wearable device is non-visibility status in a car according to an embodiment of the present disclosure.

FIG. 20 illustrates an example of a structure of a non-visibility status of the wearable device in a car according to an embodiment of the present disclosure.

Referring to FIG. 20, in a car driving mode, and when the display of the smart watch is positioned to face a direction of the back of the hand on the wrist, the smart watch is in a non-visibility status. In this case, the wearable device may acoustically provide various pieces of information related to a particular function through a speaker of an input/output device 1640. For example, the wearable device may output a received message through the speaker.

FIG. 21 illustrates an example of an operation in which the wearable device performs a particular function according to a user interaction according to an embodiment of the present disclosure.

Referring to FIG. 21, when a call connection request is received, the wearable device may accept or reject the call connection request based on a change in a wearable mode. For example, when a call connection request is received as illustrated in a screen 2110, the wearable device may reject the call connection request in response to an input of tilting the display of the wearable device from a direction of the back of the hand to a side direction. According to an embodiment of the present disclosure, the wearable device may perform a function of rejecting the call connection request and transmit a preset message to the device having transmitted the call connection request simultaneously or sequentially (screen 2130).

Figure 22:
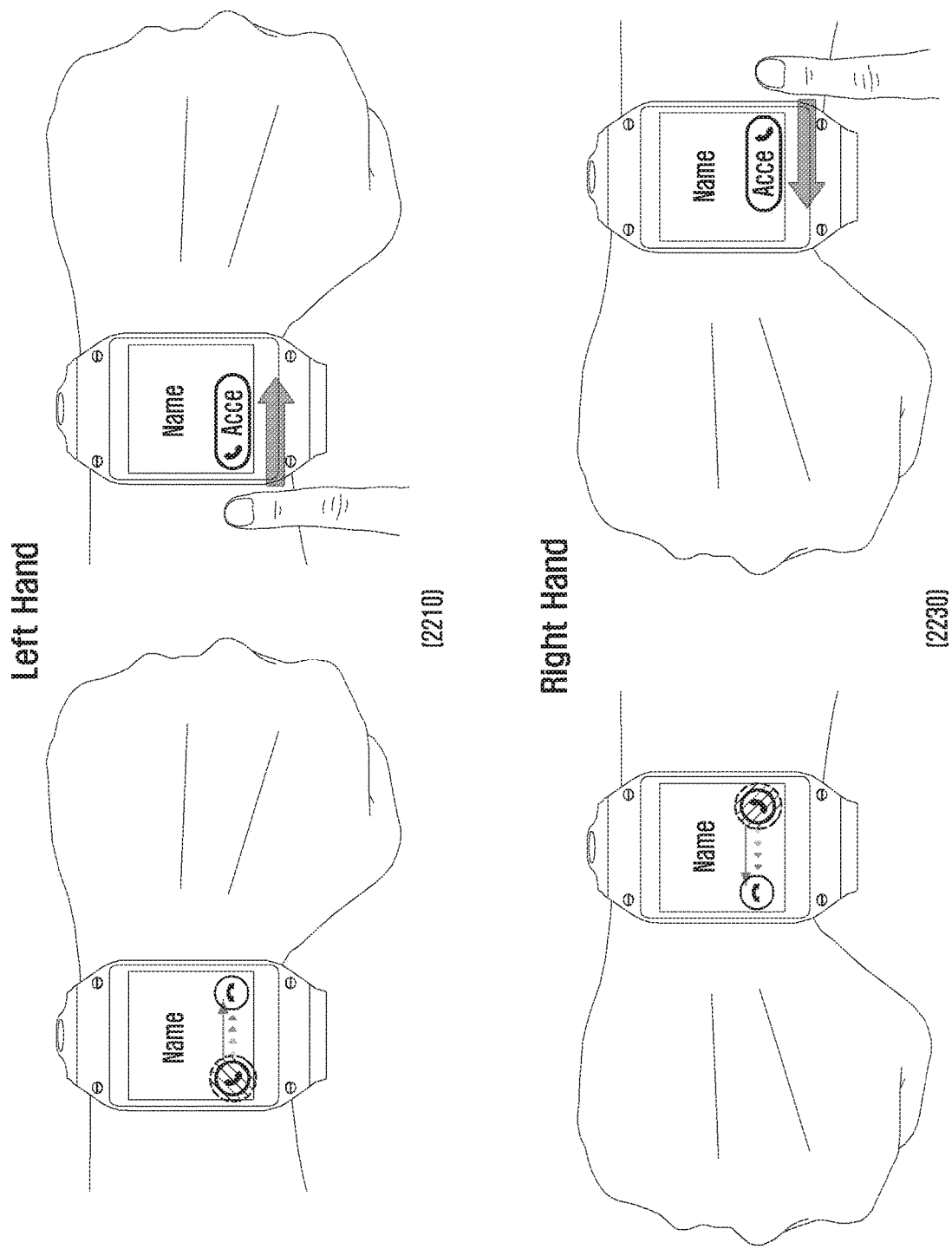
FIG. 22 illustrates an example of an operation in which a wearable device performs a particular function according to a user interaction according to an embodiment of the present disclosure.

FIG. 22 illustrates an example of an operation in which the wearable device performs a particular function according to a user interaction according to an embodiment of the present disclosure.

Referring to FIG. 22, the wearable device may perform a particular function according to a mirror type gesture input. The processor of the wearable device may accept or reject a call connection request based on the hand on which the wearable device is worn. For example, when the wearable device is worn on the left hand, the wearable device may accept or reject the call connection request in response to a swipe input from the left side to the right side of the display (screen 2210). On the contrary to this, when the wearable device is worn on the right hand, the wearable device may accept or reject the call connection request in response to a swipe input from the right side to the left side of the display (screen 2230).

Figure 23:
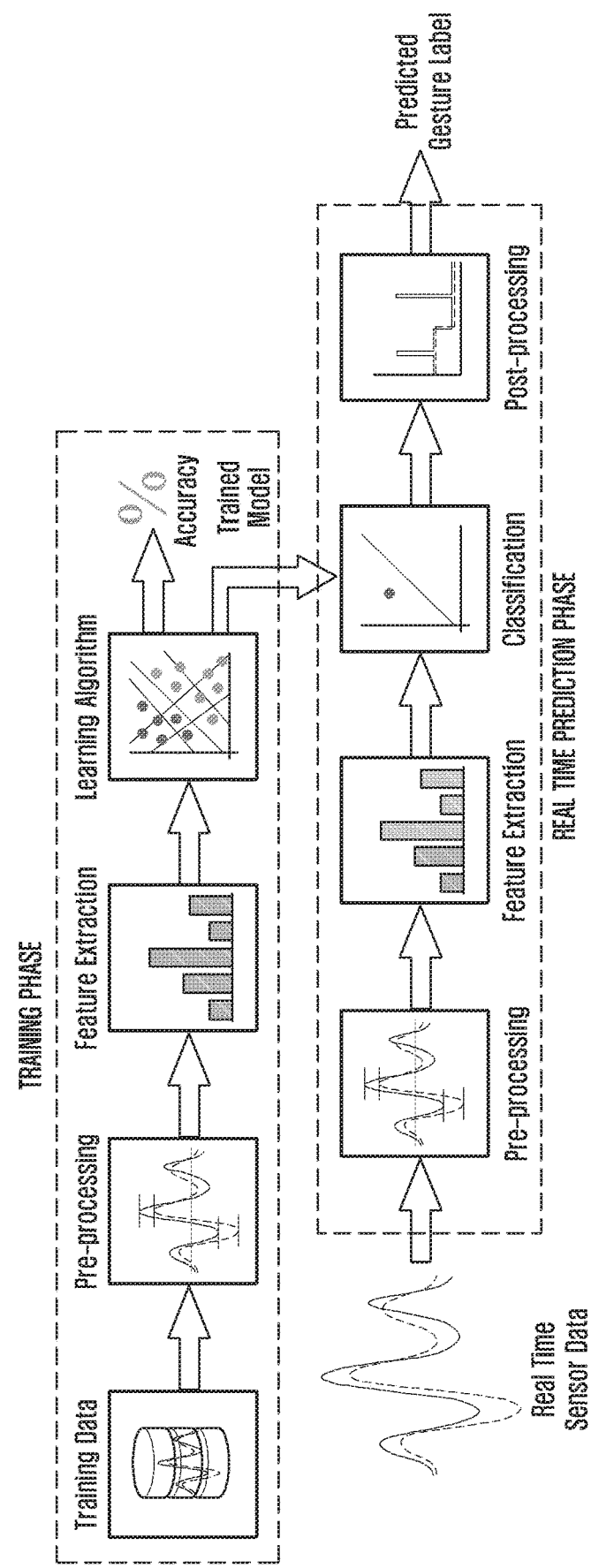
FIG. 23 illustrates an example of a machine learning algorithm that makes support such that a wearable device determines a wearable mode, positioning of a user's hand, and a hand on which the wearable device is worn according to an embodiment of the present disclosure.

FIG. 23 illustrates an example of a machine learning algorithm that makes support such that the wearable device determines a wearable mode, positioning of a user's hand, and the hand on which the wearable device is worn according to an embodiment of the present disclosure.

Referring to FIG. 23, the machine learning algorithm may be used to classify and determine values of sensors included in the wearable device. The machine learning algorithm may use Support Vecor Machines (SVM). In order to apply the machine learning algorithm, training data such as statistical sensor values and parameters which may be collected by the wearable device may be needed. The wearable device may more accurately detect the wearable mode by the support of the machine learning algorithm.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of providing user interaction with a wearable device which includes a display, the method comprising:
   receiving at least one signal from at least one vibration sensor in the wearable device;
   obtaining first information of whether a hand of a user wrist on which the wearable device is being worn is a left hand or a right hand based on the at least one signal from the at least one vibration sensor; and
   performing at least one function based on the obtained first information.

2. The method of claim 1, further comprising:
   receiving at least one signal from at least one gyroscope sensor in the wearable device;
   obtaining second information related to an orientation of at least one of the user wrist on which the wearable device is being worn and the display of the wearable device based on the at least one signal from the at least one gyroscope sensor; and
   performing the at least one function based on the first and the second information.

3. The method of claim 2, further comprising:
   receiving at least one signal from at least one pressure sensor in the wearable device;
   obtaining third information related to a worn position of the wearable device on the user wrist based on the at least one signal from the at least one pressure sensor in the wearable device; and
   performing the at least one function based on the first to the third information.

4. The method of claim 3, wherein the at least one pressure sensor comprises a first set of pressure sensors located in a body of the wearable device and a second set of pressure sensors located in a strap of the wearable device.

5. The method of claim 4, wherein the third information is determined by:
   comparing output signals received from the first set of pressure sensors and the second set of pressure sensors;
   when the output signals of the first set of pressure sensors are greater than output signals of the second set of pressure sensors and a difference between the output signals of the first set of pressure sensors and the output signals of the second set of pressure sensors is greater than or equal to a preset threshold, determining that the display of the wearable device on the user wrist is positioned to face a direction of a back of the hand;
   when the output signals of the first set of pressure sensors are less than the output signals of the second set of pressure sensors and the difference between the output signals of the first set of pressure sensors and the output signals of the second set of pressure sensors is greater than or equal to the preset threshold, determining that the display of the wearable device on the user wrist is positioned to face a direction of a palm of the hand; and
   when the difference between the output signals of the first set of pressure sensors and the output signals of the second set of pressure sensors is less than the preset threshold, determining that the display of the wearable device on the user wrist is positioned to face a direction of a side of the user wrist.

6. The method of claim 2, further comprising:
   obtaining third information related to a worn position of the wearable device on the user wrist based on the at least one signal from the at least one vibration sensor in the wearable device; and
   performing the at least one function based on the first to the third information.

7. The method of claim 6, wherein the at least one vibration sensor comprises a first set of vibration sensors located in a body of the wearable device and a second set of vibration sensors located in a strap of the wear device.

8. The method of claim 7, wherein the third information is determined by:
   comparing output signals received from the first set of vibration sensors and the second set of vibration sensors;
   when the output signals of the first set of vibration sensors are greater than output signals of the second set of vibration sensors and a difference between the output signals of the first set of vibration sensors and the output signals of the second set of vibration sensors is greater than or equal to a preset threshold, determining that the display of the wearable device on the user wrist is positioned to face a direction of a back of the hand;
   when the output signals of the first set of vibration sensors are less than the output signals of the second set of vibration sensors and the difference between the output signals of the first set of vibration sensors and the output signals of the second set of vibration sensors is greater than or equal to the preset threshold, determining that the display of the wearable device on the user wrist is positioned to face a direction of a palm of the hand; and
   when the difference between the output signals of the first set of vibration sensors and the output signals of the second set of vibration sensors is less than the preset threshold, determining that the display of the wearable device on the user wrist is positioned to face a direction of a side of the user wrist.

9. The method of claim 3, wherein the performing the at least one function comprises:
   determining at least one of a visibility status and an angle of visibility of the wearable device based on the first to the third information; and
   performing the at least one function based on at least one of the determined visibility status and the determined angle of visibility of the wearable device.

10. The method of claim 9, wherein the performing the at least one function based on the at least one of the determined visibility status and the determined angle of visibility of the wearable device comprises:

adjusting a user interface (UI) layout of the display of the wearable device.

11. The method of claim 1, wherein the at least one vibration sensor is located in a body of the wearable device and comprises a third set of vibration sensors and a fourth set of vibration sensors.

12. The method of claim 11, wherein the third set of vibration sensors and the fourth set of vibration sensors are located in a left side and a right side of the body of the wearable device, respectively where the at least one vibration sensor is not aligned with an orientation of a strap of the wearable device.

13. The method of claim 12, wherein the first information is determined by:
comparing output signals received from the third set of vibration sensors and the fourth set of vibration sensors;
when the output signals of the third set of vibration sensors are greater than output signals of the fourth set of vibration sensors, determining that the hand of the user wrist on which wearable device is being worn is the left hand;
when the output signals of the third set of vibration sensors are less than the output of the fourth set of vibration sensors, determining that the hand of the user wrist on which wearable device is being worn is the right hand; and
when no output signals are received from the third set of vibration sensors and the fourth set of vibration sensors, determining that the wearable device is not being worn on either hand.

14. The method of claim 1, wherein the performing the at least one function comprises changing a user interface (UI) of the display of the wearable device.

15. The method of claim 14, wherein the performing the at least one function comprises:
accepting or rejecting a call connection request in response to a first swiping touch gesture of a first direction on the display when the wearable device is worn on the left hand; and
accepting or rejecting the call connection request in response to a second swiping touch gesture of a second direction which is opposite to the first direction when the wearable device is worn on the right hand.

16. A wearable device comprising:
a display;
at least one vibration sensor; and
a processor configured to:
receive at least one signal from the at least one vibration sensor,
obtain first information of whether a hand of a user wrist on which the wearable device is being worn is a left hand or a right hand based on the at least one signal from the at least one vibration sensor, and
perform at least one function based on the obtained first information.

17. The wearable device of claim 16, further comprising at least one gyroscope sensor,
wherein the processor is further configured to obtain second information related to an orientation of at least one of the user wrist on which the wearable device is being worn and the display based on at least one signal from the at least one gyroscope sensor.

18. The wearable device of claim 16, wherein the wearable device is a smart watch.

19. The wearable device of claim 16, further comprising at least one pressure sensor,
wherein the processor is further configured to obtain third information related to a worn position of the wearable device on the user wrist based on at least one signal from the at least one pressure sensor.

20. The wearable device of claim 19, wherein the at least one pressure sensor comprises a first set of pressure sensors located in a body of the wearable device and a second set of pressure sensors located in a strap of the wearable device.

21. The wearable device of claim 20, wherein the processor is further configured to:
compare output signals received from the first set of pressure sensors and the second set of pressure sensors,
when the output signals of the first set of pressure sensors are greater than the output signals of the second set of pressure sensors and a difference between the output signals of the first set of pressure sensors and the output signals of the second set of pressure sensors is greater than or equal to a preset threshold, determine that the display of the wearable device on the user wrist is positioned to face a direction of a back of the hand,
when the output signals of the first set of pressure sensors are less than the output signals of the second set of pressure sensors and the difference between the output signals of the first set of pressure sensors and the output signals of the second set of pressure sensors is greater than or equal to the preset threshold, determine that the display of the wearable device on the user wrist is positioned to face a direction of a palm of the hand, and
when the difference between the output signals of the first set of pressure sensors and the output signals of the second set of pressure sensors is less than the preset threshold, determine that the display of the wearable device on the user wrist is positioned to face a direction of a side of the user wrist.

22. The wearable device of claim 16, wherein the processor is further configured to obtain third information related to a worn position of the wearable device on the user wrist based on the at least one signal from the at least one vibration sensor.

23. The wearable device of claim 22, wherein the at least one vibration sensor comprises a first set of vibration sensors located in a body of the wearable device and a second set of vibration sensors located in a strap of the wearable device.

24. The wearable device of claim 23, wherein the processor is further configured to:
compare output signals received from the first set of vibration sensors and the second set of vibration sensors,
when output signals of the first set of vibration sensors are greater than output signals of the second set of vibration sensors and a difference between the output signals of the first set of vibration sensors and the output signals of the second set of vibration sensors is greater than or equal to a preset threshold, determine that the display of the wearable device on the user wrist is positioned to face a direction of a back of the hand,
when the output signals of the first set of vibration sensors less than the output signals of the second set of vibration sensors and the difference between the output signals of the first set of vibration sensors and the output signals of the second set of vibration sensors is greater than or equal to the preset threshold, determine that the display of the wearable device on the user wrist is positioned to face a direction of a palm of the hand, and when the difference between the output signals of the first set of vibration sensors and the output signals of the second set of vibration sensors is less than the preset threshold, determine that the display of the wearable device on the user wrist is positioned to face a direction of a side of the user wrist.

25. The wearable device of claim 16, wherein the at least one vibration sensor comprises a third set of vibration sensors and a fourth set of vibration sensors.

26. The wearable device of claim 25, wherein the third set of vibration sensors and the fourth set of vibration sensors are located in a left side and a right side of a body of the wearable device, respectively, where the at least one vibration sensor is not aligned with an orientation of a strap of the wearable device.

27. The wearable device of claim 26, wherein the processor is further configured to:
  compare output signals received from the third set of vibration sensors and the fourth set of vibration sensors,
  when the output signals of the third set of vibration sensors are greater than the output signals of the fourth set of vibration sensors, determine that the hand of the user wrist on which wearable device is being worn is the left hand,
  when the output signals of the third set of vibration sensors are less than the output of the fourth set of vibration sensors, determine that the hand of the user wrist on which wearable device is being worn is the right hand, and
  when no output signals are received from the third set of vibration sensors and the fourth set of vibration sensors, determine that the wearable device is not being worn on either hand.

28. A method of providing user interaction with a wearable device which includes a display, the method comprising:
  receiving at least one signal from at least one pressure sensor in the wearable device;
  obtaining first information of whether a hand of a user wrist on which the wearable device is being worn is a left hand or a right hand based on the at least one signal from the at least one pressure sensor; and
  performing at least one function based on the obtained first information.

29. A wearable device comprising:
  a display;
  at least one pressure sensor; and
  a processor configured to:
    receive at least one signal from the at least one pressure sensor,
    obtain first information of whether a hand of a user wrist on which the wearable device is being worn is a left hand or a right hand based on the at least one signal from the at least one pressure sensor, and
    perform at least one function based on the obtained first information.

* * * * *